United States Patent
Ouyang et al.

(10) Patent No.: US 8,782,549 B2
(45) Date of Patent: Jul. 15, 2014

(54) INCREMENTAL FEATURE-BASED GESTURE-KEYBOARD DECODING

(71) Applicants: Yu Ouyang, San Jose, CA (US); Shumin Zhai, Los Altos, CA (US); Ciprian Ioan Chelba, Palo Alto, CA (US); Xiaojun Bi, Sunnyvale, CA (US); Satoshi Kataoka, Tokyo (JP); Ken Wakasa, Tokyo (JP); Keisuke Kuroyanagi, Tokyo (JP)

(72) Inventors: Yu Ouyang, San Jose, CA (US); Shumin Zhai, Los Altos, CA (US); Ciprian Ioan Chelba, Palo Alto, CA (US); Xiaojun Bi, Sunnyvale, CA (US); Satoshi Kataoka, Tokyo (JP); Ken Wakasa, Tokyo (JP); Keisuke Kuroyanagi, Tokyo (JP)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/734,810

(22) Filed: Jan. 4, 2013

(65) Prior Publication Data
US 2014/0101594 A1 Apr. 10, 2014

Related U.S. Application Data

(63) Continuation-in-part of application No. 13/646,521, filed on Oct. 5, 2012.

(60) Provisional application No. 61/714,568, filed on Oct. 16, 2012.

(51) Int. Cl.
G06F 3/048 (2013.01)
G06F 3/0488 (2013.01)
G06F 3/023 (2006.01)

(52) U.S. Cl.
CPC ........ *G06F 3/04886* (2013.01); *G06F 3/04883* (2013.01); *G06F 3/0236* (2013.01)
USPC ....................................... 715/773

(58) Field of Classification Search
CPC G06F 3/04886; G06F 3/04883; G06F 3/0236
USPC .......................................................... 715/773
See application file for complete search history.

(56) References Cited

U.S. PATENT DOCUMENTS 4,833,610 A 5/1989 Zamora et al.
4,847,766 A 7/1989 McRae et al.

(Continued)

FOREIGN PATENT DOCUMENTS

EP 0844570 A2 5/1998
EP 1603014 A1 7/2005

(Continued)

OTHER PUBLICATIONS

Response to Office Action dated Jan. 31, 2013, from U.S. Appl. No. 13/646,521, filed Apr. 30, 2013, 17 pp.

(Continued)

*Primary Examiner* — Omar Abdul-Ali
*Assistant Examiner* — Anil Bhargava
(74) *Attorney, Agent, or Firm* — Shumaker & Sieffert, P.A.

(57) ABSTRACT

In one example, a method includes outputting, at a presence-sensitive display operatively coupled to a computing device, a graphical keyboard comprising a plurality of keys and receiving an indication of a gesture to select a group of keys of the plurality of keys. The method may further include determining, in response to the indication, a candidate word based at least in part on the group of keys. The method may further include determining a group of alignment points traversed by the gesture and respective cost values for each of at least two keys of the plurality of keys. The method may further include comparing the respective cost values for at least each of at least two keys of the plurality of keys to determine a combination of keys having a combined cost value and outputting the candidate word that is based on the respective cost values.

23 Claims, 6 Drawing Sheets

(56) References Cited

U.S. PATENT DOCUMENTS

| | | | |
|---|---|---|---|
| 5,748,512 A | 5/1998 | Vargas | |
| 5,761,689 A | 6/1998 | Rayson et al. | |
| 5,765,180 A | 6/1998 | Travis | |
| 5,845,306 A | 12/1998 | Schabes et al. | |
| 6,008,799 A | 12/1999 | Van Kleeck | |
| 6,041,292 A | 3/2000 | Jochim | |
| 6,047,300 A | 4/2000 | Walfish | |
| 6,131,102 A | 10/2000 | Potter | |
| 6,286,064 B1 | 9/2001 | King et al. | |
| 6,292,179 B1 | 9/2001 | Lee | |
| 6,424,983 B1 | 7/2002 | Schabes et al. | |
| 6,573,844 B1 | 6/2003 | Venolia et al. | |
| 6,789,231 B1 | 9/2004 | Reynar et al. | |
| 6,801,190 B1 | 10/2004 | Robinson et al. | |
| 7,028,259 B1 | 4/2006 | Jacobson | |
| 7,030,863 B2 | 4/2006 | Longe et al. | |
| 7,042,443 B2 | 5/2006 | Woodard et al. | |
| 7,075,520 B2 | 7/2006 | Williams | |
| 7,088,345 B2 | 8/2006 | Robinson et al. | |
| 7,098,896 B2 | 8/2006 | Kushler et al. | |
| 7,145,554 B2 | 12/2006 | Bachmann | |
| 7,151,530 B2 | 12/2006 | Roeber et al. | |
| 7,170,430 B2 | 1/2007 | Goodgoll | |
| 7,199,786 B2 | 4/2007 | Suraqui | |
| 7,207,004 B1 | 4/2007 | Harrity | |
| 7,231,343 B1 | 6/2007 | Treadgold et al. | |
| 7,250,938 B2 | 7/2007 | Kirkland et al. | |
| 7,251,367 B2 | 7/2007 | Zhai | |
| 7,277,088 B2 | 10/2007 | Robinson et al. | |
| 7,296,019 B1 | 11/2007 | Chandrasekar et al. | |
| 7,336,827 B2 | 2/2008 | Geiger et al. | |
| 7,366,983 B2 | 4/2008 | Brill et al. | |
| 7,382,358 B2 | 6/2008 | Kushler et al. | |
| 7,453,439 B1 | 11/2008 | Kushler et al. | |
| 7,479,949 B2 | 1/2009 | Jobs et al. | |
| 7,487,461 B2 | 2/2009 | Zhai et al. | |
| 7,508,324 B2 | 3/2009 | Suraqui | |
| 7,542,029 B2 | 6/2009 | Kushler | |
| 7,706,616 B2 | 4/2010 | Kristensson et al. | |
| 7,716,579 B2 | 5/2010 | Gunn et al. | |
| 7,730,402 B2 | 6/2010 | Song | |
| 7,750,891 B2 | 7/2010 | Stephanick et al. | |
| 7,831,423 B2 | 11/2010 | Schubert | |
| 7,895,518 B2 | 2/2011 | Kristensson | |
| 7,907,125 B2 | 3/2011 | Weiss et al. | |
| 7,920,132 B2 | 4/2011 | Longe et al. | |
| 7,921,361 B2 | 4/2011 | Gunn et al. | |
| 7,973,770 B2 | 7/2011 | Tokkonen | |
| 8,036,878 B2 | 10/2011 | Assadollahi | |
| 8,135,582 B2 | 3/2012 | Suraqui | |
| 8,232,973 B2* | 7/2012 | Kocienda et al. | 345/173 |
| 8,266,528 B1 | 9/2012 | Hayes | |
| 8,280,886 B2 | 10/2012 | Labrou et al. | |
| 8,359,543 B2 | 1/2013 | Sengupta | |
| 8,667,414 B2 | 3/2014 | Zhai et al. | |
| 8,701,032 B1 | 4/2014 | Zhai et al. | |
| 2002/0013794 A1 | 1/2002 | Carro et al. | |
| 2002/0129012 A1 | 9/2002 | Green | |
| 2002/0143543 A1 | 10/2002 | Sirivara | |
| 2002/0194223 A1 | 12/2002 | Meyers et al. | |
| 2003/0095053 A1 | 5/2003 | Kandogan et al. | |
| 2003/0095104 A1 | 5/2003 | Kandogan et al. | |
| 2003/0097252 A1 | 5/2003 | Mackie | |
| 2003/0165801 A1 | 9/2003 | Levy | |
| 2004/0120583 A1 | 6/2004 | Zhai | |
| 2004/0140956 A1* | 7/2004 | Kushler et al. | 345/168 |
| 2005/0052406 A1* | 3/2005 | Stephanick et al. | 345/156 |
| 2005/0114115 A1* | 5/2005 | Karidis et al. | 704/10 |
| 2005/0190973 A1* | 9/2005 | Kristensson et al. | 382/229 |
| 2006/0004638 A1 | 1/2006 | Royal et al. | |
| 2006/0026536 A1 | 2/2006 | Hotelling et al. | |
| 2006/0028450 A1 | 2/2006 | Suraqui | |
| 2006/0050962 A1 | 3/2006 | Geiger et al. | |
| 2006/0053387 A1 | 3/2006 | Ording | |
| 2006/0055669 A1 | 3/2006 | Das | |
| 2006/0119582 A1 | 6/2006 | Ng et al. | |
| 2006/0176283 A1 | 8/2006 | Suraqui | |
| 2006/0253793 A1 | 11/2006 | Zhai et al. | |
| 2006/0265648 A1 | 11/2006 | Rainisto et al. | |
| 2007/0016862 A1* | 1/2007 | Kuzmin | 715/700 |
| 2007/0040813 A1 | 2/2007 | Kushler et al. | |
| 2007/0083276 A1 | 4/2007 | Song | |
| 2007/0089070 A1 | 4/2007 | Jaczyk | |
| 2007/0094024 A1 | 4/2007 | Kristensson et al. | |
| 2007/0213983 A1 | 9/2007 | Ramsey | |
| 2008/0017722 A1 | 1/2008 | Snyder et al. | |
| 2008/0100579 A1 | 5/2008 | Robinson et al. | |
| 2008/0122796 A1 | 5/2008 | Jobs et al. | |
| 2008/0167858 A1 | 7/2008 | Christie et al. | |
| 2008/0172293 A1 | 7/2008 | Raskin et al. | |
| 2008/0232885 A1 | 9/2008 | Mock et al. | |
| 2008/0270896 A1 | 10/2008 | Kristensson | |
| 2008/0316183 A1 | 12/2008 | Westerman et al. | |
| 2009/0058823 A1 | 3/2009 | Kocienda | |
| 2009/0100383 A1 | 4/2009 | Sunday et al. | |
| 2009/0119376 A1 | 5/2009 | Bomma | |
| 2009/0189864 A1 | 7/2009 | Walker et al. | |
| 2010/0021871 A1 | 1/2010 | Layng et al. | |
| 2010/0029910 A1 | 2/2010 | Shiba et al. | |
| 2010/0070908 A1 | 3/2010 | Mori et al. | |
| 2010/0079382 A1 | 4/2010 | Suggs | |
| 2010/0125594 A1 | 5/2010 | Li et al. | |
| 2010/0141484 A1 | 6/2010 | Griffin et al. | |
| 2010/0199226 A1 | 8/2010 | Nurmi | |
| 2010/0235780 A1 | 9/2010 | Westerman et al. | |
| 2010/0238125 A1 | 9/2010 | Ronkainen | |
| 2010/0257478 A1 | 10/2010 | Longe et al. | |
| 2010/0259493 A1 | 10/2010 | Chang et al. | |
| 2010/0271299 A1 | 10/2010 | Stephanick et al. | |
| 2010/0315266 A1 | 12/2010 | Gunawardana et al. | |
| 2011/0061017 A1 | 3/2011 | Ullrich et al. | |
| 2011/0063224 A1 | 3/2011 | Vexo et al. | |
| 2011/0063231 A1 | 3/2011 | Jakobs et al. | |
| 2011/0066984 A1 | 3/2011 | Li | |
| 2011/0071834 A1 | 3/2011 | Kristensson et al. | |
| 2011/0103682 A1 | 5/2011 | Chidlovskii et al. | |
| 2011/0107206 A1 | 5/2011 | Walsh et al. | |
| 2011/0119617 A1* | 5/2011 | Kristensson | 715/773 |
| 2011/0122081 A1 | 5/2011 | Kushler | |
| 2011/0202836 A1 | 8/2011 | Badger et al. | |
| 2011/0208511 A1 | 8/2011 | Sikstrom et al. | |
| 2011/0208513 A1 | 8/2011 | Nicks et al. | |
| 2011/0209088 A1 | 8/2011 | Hinckley et al. | |
| 2011/0210850 A1 | 9/2011 | Tran | |
| 2011/0234524 A1 | 9/2011 | Longe et al. | |
| 2011/0242000 A1 | 10/2011 | Bi et al. | |
| 2011/0254798 A1 | 10/2011 | Adamson et al. | |
| 2012/0011462 A1 | 1/2012 | Westerman et al. | |
| 2012/0029910 A1 | 2/2012 | Medlock et al. | |
| 2012/0036468 A1 | 2/2012 | Colley | |
| 2012/0036469 A1* | 2/2012 | Suraqui | 715/773 |
| 2012/0036485 A1 | 2/2012 | Watkins, Jr. et al. | |
| 2012/0336469 | 2/2012 | Suraqui | |
| 2012/0075190 A1 | 3/2012 | Sengupta | |
| 2012/0079412 A1 | 3/2012 | Kocienda et al. | |
| 2012/0098846 A1 | 4/2012 | Wun et al. | |
| 2012/0113008 A1 | 5/2012 | Makinen et al. | |
| 2012/0127080 A1 | 5/2012 | Kushler et al. | |
| 2012/0127082 A1 | 5/2012 | Kushler et al. | |
| 2012/0131035 A1 | 5/2012 | Yang et al. | |
| 2012/0162092 A1 | 6/2012 | Pasquero et al. | |
| 2012/0166428 A1 | 6/2012 | Kakade et al. | |
| 2012/0223889 A1* | 9/2012 | Medlock et al. | 345/168 |
| 2012/0242579 A1 | 9/2012 | Chua | |
| 2012/0310626 A1 | 12/2012 | Kida et al. | |
| 2013/0046544 A1 | 2/2013 | Kay et al. | |
| 2013/0082824 A1 | 4/2013 | Colley | |
| 2013/0120266 A1 | 5/2013 | Griffin et al. | |
| 2013/0125034 A1 | 5/2013 | Griffin et al. | |

FOREIGN PATENT DOCUMENTS

| WO | 2004/066075 A2 | 8/2004 |
| --- | --- | --- |
| WO | 2008/013658 A2 | 1/2008 |
| WO | 2011113057 A1 | 9/2011 |

OTHER PUBLICATIONS

U.S. Appl. No. 13/646,521, by Shumin Zhai, filed Oct. 5, 2012.
CiteSeer, "Token Passing: a Simple Conceptual Model for Connected Speech Recognition Systems" (1989), by S.J. Young et al., found at (http://citeseerx.ist.psu.edu/viewdoc/summary?doi=10.1.1.17.7829), accessed on Apr. 30, 2012, 2 pp.
Split Keyboard for iPad [Concept], by Skipper Eye, Apr. 23, 2010, found at http://www.redmondpie.com/split-keyboard-for-ipad-9140675/, 6 pp.
Split Keyboard for Thumb Typing Coming to iPad with iOS 5, by Kevin Purcell, Jun. 6, 2011, found at http://www.gottabemobile.com/2011/06/06/split-keyboard-for-thumb-typing-coming-to-ipad-with-ios-5/, 8 pp.
7 Swype keyboard tips for better Swyping, by Ed Rhee, found at http://howto.cnet.com/8301-11310_39-20070627-285/7-swype-keyboard-tips-for-better-swyping/, posted Jun. 14, 2011, 5 pp.
Keymonk—The Future of Smartphone Keyboards, found at www.keymonk.com, downloaded Sep. 5, 2012, 2 pp.
Keymonk Keyboard Free—Android Apps on Google Play, Description, found at https://play.google.com/store/apps/details?id=com.keymonk.latin&hl=en, downloaded Oct. 3, 2012, 2 pp.
Keymonk Keyboard Free—Android Apps on Google Play, User Reviews, found at https://play.google.com/store/apps/details?id=com.keymonk.latin&hl=en, downloaded Oct. 3, 2012, 2 pp.
Keymonk Keyboard Free—Android Apps on Google Play, What's New, found at https://play.google.com/store/apps/details?id=com.keymonk.latin&hl=en, downloaded Oct. 3, 2012, 2 pp.
Keymonk Keyboard Free—Android Apps on Google Play, Permissions, found at https://play.google.com/store/apps/details?id=com.keymonk.latin&hl=en, downloaded Oct. 3, 2012, 2 pp.
ShapeWriter Keyboard allows you to input on Android the same experience with on PC, Android forums, found at talkandroid.com/.../2767-shapewriter-keyboard-allows-you-input-android-same-experience-pc.html, last updated Oct. 25, 2009, 3 pp.
ShapeWriter vs Swype Keyboard, DroidForums.net, found at www.droidforums.net/forum/droid-applications/48707-shapewriter-vs-swype-keyboard.html, last updated Jun. 1, 2010, 5 pp.
Advanced tips for Swype, found at www.swype.com/tips/advanced-tips/, downloaded Aug. 20, 2012, 3 pp.
Welcome to CooTek—TouchPal, an innovative soft keyboard, TouchPal v1.0 for Android will Release Soon!, found at www.cootek.com/intro-android.aspx, downloaded Aug. 20, 2012, 2 pp.
Dasur Pattern Recognition Ltd. SlideIT Keyboard—User Guide, Jul. 2011, found at http://www.mobiletextinput.com/App_Open/Manual/SlideIT_UserGuide%5BEnglish%5Dv4.0.pdf, 21 pp.
Why your typing sucks on Android, and how to fix it, by Martin Bryant, Mar. 3, 2010, found at thenextweb.com/mobile/2010/03/03/typing-sucks-android-fix/, 3 pp.
Avoid iPhone navigation and typing hassles, by Ted Landau, Dec. 28, 2007, found at www.macworld.com/article/1131264/tco_iphone.html, 9 pp.
Kristensson et al., "Command Strokes with and without Preview: Using Pen Gestures on Keyboard for Command Selection," CHI Proceedings, San Jose, CA, USA, Apr. 28-May 3, 2007, 10 pp.
How to Type Faster with the Swype Keyboard for Android—How-To Geek, found at www.howtogeek.com/106643/how-to-type-faster-with-the-swype-keyboard-for-android/, downloaded Jun. 4, 2012, 13 pp.
Android OS—Language & keyboard settings, found at support.google.com/ics/nexus/bin/answer.py?hl=en&answer=168584, downloaded Jun. 4, 2012, 3 pp.
Nuance Supercharges Swype, Adds New Keyboard Options, XT9 Predictive Text, and Dragon-Powered Voice Input, found at http://techcrunch.com/2012/06/20/nuance-supercharges-swype-adds-new-keyboard-options-xt9-predictive-text-and-dragon-powered-voice-input/, downloaded Jun. 4, 2012, 2 pp.
Sensory Software—Text Chat, found at www.sensorysoftware.com/textchat.html, downloaded Jun. 4, 2012, 3 pp.
Swype—Swype Basics, found at www.swype.com/tips/swype-basics/, downloaded Jun. 8, 2012, 2 pp.
Williamson et al., "Hex: Dynamics and Probabilistic Text Entry," Switching and Learning LNCS 3355, pp. 333-342, 2005.
Kristensson et al,. "Shark2: A Large Vocabulary Shorthand Writing System for Pen-based Computers," UIST, vol. 6, issue 2, Oct. 24-27, 2004.
Young et al., "Token Passing: a Simple Conceptual Model for Connected Speech Recognition Systems," Cambridge University Engineering Department, Jul. 31, 1989, 23 pp.
ShapeWriter Research Project home page, accessed May 25, 2012, found at http://www.almaden.ibm.com/u/zhai/shapewriter_research.htm, 12 pp.
Swiftkey 3 Keyboard—Android Apps on Google Play, found at https://play.google.com/store/apps/details?id=com.touchtype.swiftkey&hl=en, accessed on Jun. 8, 2012, 2 pp.
"SwiftKey Counters Swipe with a Smart Version, Makes an In-Road Into Healthcare Market" by Mike Butcher, found at http://techcrunch.com/2012/06/21/swiftkey-counters-swype-with-a-smarter-version-makes-an-in-road-into-healthcare-market/, Jun. 21, 2012, 1 p.
Non-Final Office Action from U.S. Appl. No. 13/646,521, dated Jan. 31, 2013, 24 pp.
U.S. Appl. No. 60/430,338, by Daniel Suraqui, filed Nov. 29, 2002.
U.S. Appl. No. 60/505,724, by Daniel Suraqui, filed Sep. 22, 2003.
"SwiftKey 3 Keyboard—Android Apps on Google Play," found at web.archive.org/web/20121020153209/https://play.google.com/store/apps/details?id=com.touchtype.swiftkey&hl=en, accessed on Oct. 20, 2012, 4 pp.
"SwiftKey 3 Keyboard—Android Apps on Google Play," found at web.archive.org/web/20121127141326/https://play.google.com/store/apps/details?id=com.touchtype.swiftkey&hl=en, accessed on Nov. 27, 2012, 4 pp.
SlideIT Soft Keyboard, SlideIT [online], First accessed on Jan. 31, 2012, retrieved from the Internet: https://play.google.com/store/apps/details?id=com.dasur.slideit.vt.lite&hl=en>, 4 pp.
Swiftkey, "Swiftkey 3 Keyboard" retrieved from https://play.google.com/store/apps/detais, accessed on Jul. 17, 212, 3 pp.
"Swipe Nuance Home, Type Fast, Swipe Faster," found at http://www.swipe.com/, accessed on May 25, 2012, 1 p.
Wobbrock et al., "$1 Unistroke Recognizer in JavaScript," [online], first accessed on Jan. 24, 2012, retrieved from the Internet: http://depts.washington.edu/aimgroup/proj/dollar/>, 2 pp.
Wobbrock et al., "Gestures without Libraries, Toolkits or Training: A $1 Recognizer for User Inter face Prototypes," UIST 2007, Proceedings of the 20th Annual ACM Symposium on User Interface Software and Technology, Aug. 19, 2007, pp. 159-168.
U.S. Appl. No. 13/592,131, by Shuman Zhai, filed Aug. 22, 2012.
U.S. Appl. No. 13/793,825, by Xiaojun Bi, filed Mar. 11, 2013.
U.S. Appl. No. 13/657,574, by Yu Ouyang, filed Oct. 22, 2012.
U.S. Appl. No. 13/858,684, by Yu Ouyang, filed Apr. 8, 2013.
U.S. Appl. No. 13/787/513, by Shuman Zhai, filed Mar. 6, 2013.
Office Action from U.S. Appl. No. 13/646,521, dated Aug. 5, 2013, 36 pp.
"Hey Apple, What the Next iPhone Really, Really Needs is a Much Better Keyboard," by Natasha Lomas, downloaded Apr. 22, 2013, from techcrunch.com/2013/04/21/the-iphone-keyboard-stinks/?, 6 pp.
Tappert et al., "The State of the Art in On-Line Handwriting Recognition," IEEE Transactions on Pattern Analysis and Machine Intelligence, vol. 12, No. 8, Aug. 1990, pp. 787-808.
Li et al., "A Fast and Accurate Gesture Recognizer," CHI 2010, Apr. 10-15, 2010, Atlanta, Georgia, pp. 2169-2172.
Response to Office Action dated Aug. 5, 2013, from U.S. Appl. No. 13/646,521, filed Oct. 7, 2013, 16 pp.
Response to Office Action dated Aug. 5, 2013, from U.S. Appl. No. 13/646,521, filed Nov. 5, 2013, 16 pp.
International Search Report and Written Opinion of International Application No. PCT/US2013/063316, mailed Jan. 3, 2014, 10 pp.

(56) References Cited

OTHER PUBLICATIONS

International Search Report and Written Opinion of International Application No. PCT/US2013/063237, mailed Jan. 15, 2014, 10 pp.

U.S. Appl. No. 13/907,614, by Yu Ouyang, filed May 31, 2013.

Kane et al., "TrueKeys: Identifying and Correcting Typing Errors for People with Motor Impairments," Proceedings of the 13th International Conference on Intelligent User Interfaces, IUI '08, Jan. 13, 2008, 4 pp.

Karch, "Typing, Copy, and Search," Android Tablets Made Simple, Nov. 18, 2011, 13 pp.

Naseem, "A Hybrid Approach for Urdu Spell Checking," MS Thesis, National University of Computer & Emerging Sciences, retrieved from the internet http://www.cle.org.pk/Publication/theses/2004/a_hybrid_approach_for_Urdu_spell_checking.pdf, Nov. 1, 2004, 87 pp.

Alkanhal, et al., "Automatic Stochastic Arabic Spelling Correction with Emphasis on Space Insertions and Deletions," IEEE Transactions on Audio, Speech, and Language Processing, vol. 20(7), Sep. 2012, 12 pp.

* cited by examiner

INCREMENTAL FEATURE-BASED GESTURE-KEYBOARD DECODING

This application is a continuation-in-part of U.S. application Ser. No. 13/646,521, filed Oct. 5, 2012, which is hereby expressly incorporated by reference herein. This application also claims the benefit of U.S. Provisional Application No. 61/714,568, filed Oct. 16, 2012, which is hereby expressly incorporated by reference herein.

BACKGROUND

Computing devices (e.g., mobile phones, tablet computers, etc.) may provide a graphical keyboard as part of a graphical user interface for composing text using a presence-sensitive screen. The graphical keyboard may enable a user of the computing device to enter text (e.g., an e-mail, a text message, or a document, etc.). For instance, a computing device may present a graphical, or soft, keyboard on the presence-sensitive display that permits the user to enter data by tapping keys on the keyboard display.

Gesture-based keyboards may be used to input text into a smartphone. Such keyboards may suffer from limitations in accuracy, speed, and inability to adapt to the user. Some keyboards may also require a dedicated gesture dictionary that must be maintained separately. Such keyboard may also be difficult to integrate with multiple on-device dictionaries.

SUMMARY

In one example, a method includes outputting, by a computing device and for display at a presence-sensitive display operatively coupled to the computing device, a graphical keyboard comprising a plurality of keys; receiving an indication of a gesture entered at the presence-sensitive display, the gesture to select a group of keys of the plurality of keys; determining, by the computing device and in response to receiving the indication of the gesture, a candidate word based at least in part on the group of keys, wherein the determining comprises: determining, by the computing device, a group of alignment points traversed by the gesture; determining, by the computing device, respective cost values for each of at least two keys of the plurality of keys, wherein each of the respective cost values represents a probability that an alignment point of the group of alignment points indicates a key of the plurality of keys; comparing, by the computing device, the respective cost values for at least each of at least two keys of the plurality of keys to determine a combination of keys having a combined cost value; and outputting, for display at the presence-sensitive display and based at least in part on the respective cost values, the candidate word.

In another example, a computing device, includes: at least one processor; a presence-sensitive display that is operatively coupled to the at least one processor; and at least one module operable by the at least one processor to: output, for display at the presence-sensitive display, a graphical keyboard comprising a plurality of keys; receive, at the presence-sensitive display, an indication of a gesture to select a group of keys of the plurality of keys; determine, in response to receiving the indication of the gesture, a candidate word based at least in part on the group of keys; determine a group of alignment points traversed by the gesture; determine respective cost values for each of at least two of the plurality of keys, wherein each of the respective cost values represents a probability that an alignment point of the group of alignment point indicates a key of the plurality of keys; compare the respective cost values to determine a combination of keys having a combined cost value; and determine the candidate word based at least in part on the respective cost values.

In another example, a computer-readable storage medium encoded with instructions that, when executed, cause at least one processor of a computing device to: output, by the computing device and for display at a presence-sensitive display operatively coupled to the computing device, a graphical keyboard comprising a plurality of keys; receive an indication of a gesture entered at the presence-sensitive display, the gesture to select a group of keys of the plurality of keys; determine, by the computing device and in response to receiving the indication of the gesture, a candidate word based at least in part on the group of keys, wherein the determining comprises: determine, by the computing device, a group of alignment points traversed by the gesture; determine, by the computing device, respective cost values for each of at least two keys of the plurality of keys, wherein each of the respective cost values represents a probability that an alignment point of the group of alignment points indicates a key of the plurality of keys; compare, by the computing device, the respective cost values for at least each of at least two keys of the plurality of keys to determine a combination of keys having a combined cost value; and output, for display at the presence-sensitive display and based at least in part on the respective cost values, the candidate word.

The details of one or more examples of the disclosure are set forth in the accompanying drawings and the description below. Other features, objects, and advantages will be apparent from the description and drawings, and from the claims.

DETAILED DESCRIPTION

Figure 1:
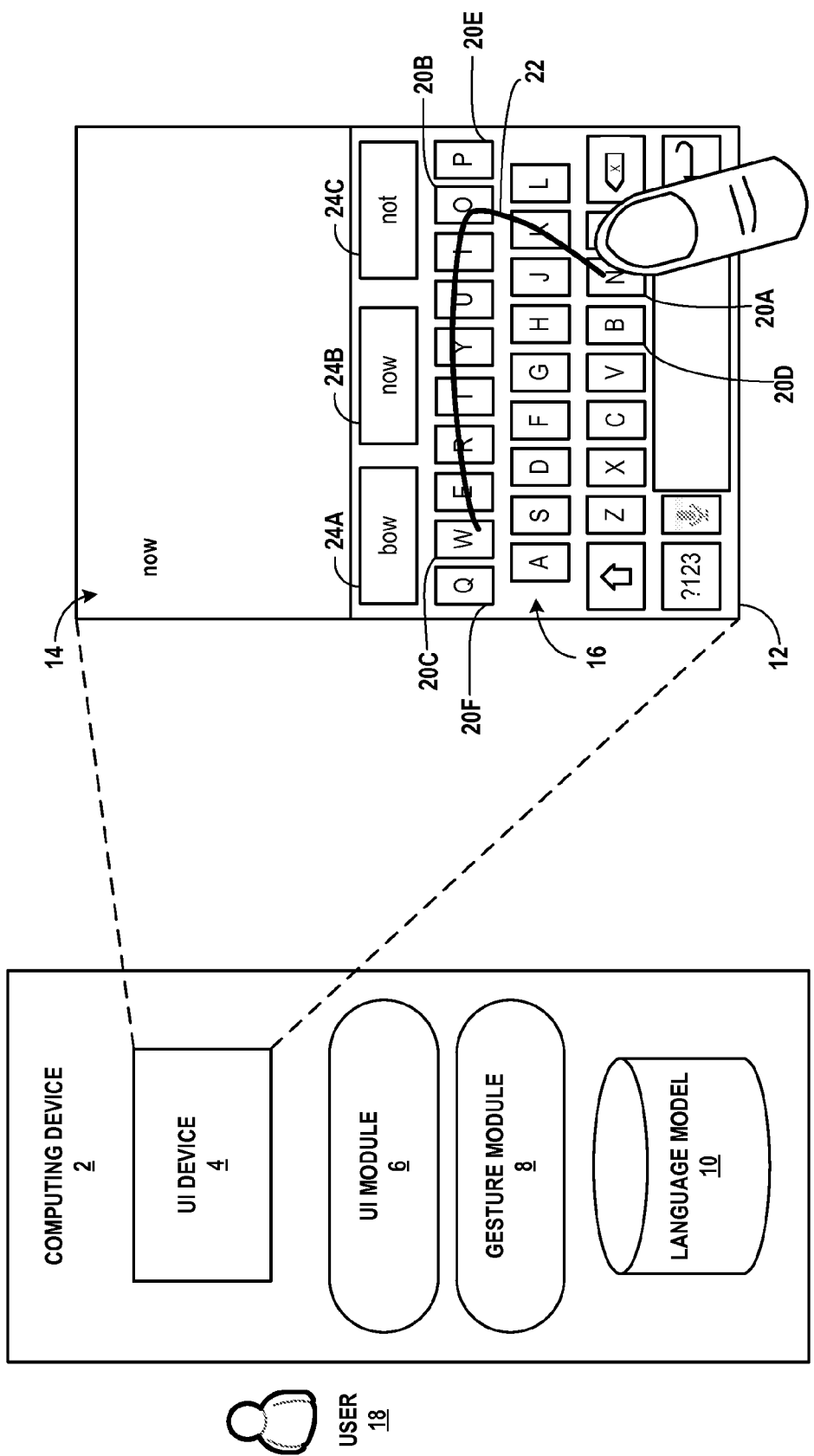
FIG. 1 is a block diagram illustrating an example computing device that may be used to incrementally determine text from a gesture, in accordance with one or more techniques of the present disclosure.

In general, this disclosure is directed to techniques for incrementally determining one or more candidate words based on a detected gesture that selects a sequence of characters included in a graphical keyboard. In some examples, a presence-sensitive display device that displays the graphical keyboard may detect the gesture. Such techniques may improve a user's ability to enter text using a graphical keyboard. A presence-sensitive display (e.g., a touch-sensitive screen) may enable a user to input text by detecting user inputs in the form of gestures performed at or near the presence-sensitive display. In some examples, a user may wish to enter a string of characters (e.g., a word), by performing one or more gestures at or near the presence-sensitive display.

Rather than performing multiple gestures to input a single word, techniques of the present disclosure may improve the speed and accuracy at which a user can enter text into a graphical keyboard of a computing device. For instance, using techniques of this disclosure, a user may, instead of performing a discrete gesture for each key of a word, perform a single gesture that indicates the word. As the user performs the gesture, the computing device may incrementally determine one or more candidate words indicated by the gesture. By incrementally determining the candidate words as the gesture is performed, the computing device may present the user with one or more candidate words with minimal post-gesture entry processing time. To determine candidate words, the incremental determinations may include searching for one or more points of a gesture that each align with a given keyboard position of a letter. The search may include selecting a point of the gesture that best aligns with the letter of the keyboard.

Based on the search, techniques of the disclosure may construct one or more probable interpretations for a gesture by traversing both the gesture and various states in a lexicon (e.g., dictionary) in parallel. In this way, techniques of the disclosure can incrementally match the gesture to words in a lexicon trie, one node/letter at a time, using a spatial gesture model. In some examples, techniques of the disclosure may use one or more spatial and/or temporal alignment features to improve the accuracy of the incremental determinations. Such techniques may also support other advanced gesture interactions such two-handed gestures and multi-word gestures.

By enabling the user to enter a word with a single gesture and performing incremental determinations to identify candidate words, techniques of this disclosure enable the user to increase the rate at which text is entered. Consequently, techniques of the disclosure may relieve a user from performing a tap gesture for each letter of the word, which may be difficult for a user and/or may result in a decreased text-entry rate due to the requirement that the user's finger discretely contact individual keys. The techniques may also reduce the effort required of a user to accurately indicate specific keys of the graphical keyboard.

FIG. 1 is a block diagram illustrating an example computing device 2 that may be used to incrementally determine text from a gesture, in accordance with one or more techniques of the present disclosure. In some examples, computing device 2 may be associated with user 18. A user associated with a computing device may interact with the computing device by providing various user inputs into the computing device.

Examples of computing device 2 may include, but are not limited to, portable or mobile devices such as mobile phones (including smart phones), laptop computers, desktop computers, tablet computers, smart television platforms, cameras, personal digital assistants (PDAs), servers, mainframes, etc. As shown in the example of FIG. 1, computing device 2 may be a tablet computer. Computing device 2, in some examples can include user interface (UI) device 4, UI module 6, gesture module 8, and language model 10. Other examples of computing device 2 that implement techniques of this disclosure may include additional components not shown in FIG. 1.

Computing device 2 may include UI device 4. In some examples, UI device 4 is configured to receive tactile, audio, or visual input. UI device 4, as shown in FIG. 1, may include a touch-sensitive and/or presence-sensitive display or any other type of device for receiving input. UI device 4 may output content such as graphical user interface (GUI) 12 for display. In the example of FIG. 1, UI device 4 may be a presence-sensitive display that can display a graphical user interface and receive input from user 18 using capacitive, inductive, and/or optical detection at or near the presence sensitive display.

As shown in FIG. 1, computing device 2 may include UI module 6. UI module 6 may perform one or more functions to receive input, such as user input or network data, and send such input to other components associated with computing device 2, such as gesture module 8. For example, UI module 6 may determine a gesture performed by user 18 at UI device 4. UI module 6 may also receive data from components associated with computing device 2, such as gesture module 8. Using the data, UI module 6 may cause other components associated with computing device 2, such as UI device 4, to provide output based on the data. For instance, UI module 6 may receive data from gesture module 8 that causes UI device 4 to display information in text entry field 14 of GUI 12.

UI module 6 may be implemented in various ways. For example, UI module 6 may be implemented as a downloadable or pre-installed application or "app." In another example, UI module 6 may be implemented as part of a hardware unit of computing device 2. In another example, UI module 6 may be implemented as part of an operating system of computing device 2.

Computing device 2, in some examples, includes gesture module 8. Gesture module 8 may include functionality to perform any variety of operations on computing device 2. For instance, gesture module 8 may include functionality to incrementally determine text from a gesture in accordance with the techniques described herein. Gesture module 8 may be implemented in various ways. For example, gesture module 8 may be implemented as a downloadable or pre-installed application or "app." In another example, gesture module 8 may be implemented as part of a hardware unit of computing device 2. In another example, gesture module 8 may be implemented as part of an operating system of computing device 2.

Gesture module 8 may receive data from components associated with computing device 2, such as UI module 6. For instance, gesture module 8 may receive gesture data from UI module 6 that causes gesture module 8 to determine text from the gesture data. Gesture module 8 may also send data to components associated with computing device 2, such as UI module 6. For instance, gesture module 8 may send text determined from the gesture data to UI module 6 that causes UI device 4 to display GUI 10.

As shown in FIG. 1, GUI 12 may be a user interface generated by UI module 6 that allows user 18 to interact with computing device 2. GUI 12 may include graphical content. Graphical content, generally, may include text, images, a group of moving images, etc. As shown in FIG. 1, graphical content may include graphical keyboard 16, text entry area 14, and word suggestion areas 24A-C (collectively "word suggestion areas 24"). Graphical keyboard 16 may include a plurality of keys, such as "N" key 20A, "O" key 20B, and "W" key 20C. In some examples, each of the plurality of keys included in graphical keyboard 16 represents a single character. In other examples, one or more of the plurality of keys included in graphical keyboard 16 represents a group of characters selected based on a plurality of modes.

In some examples, text entry area 14 may include characters or other graphical content that are included in, for example, a text-message, a document, an e-mail message, a web browser, or any other situation where text entry is desired. For instance, text entry area 14 may include characters or other graphical content that are selected by user 18 via gestures performed at UI device 4. In some examples, word suggestion areas 24 may each display a word. UI module 6 may cause UI device 4 to display graphical keyboard 16 and detect a gesture having gesture path 22 which is incrementally determined by gesture module 8 in accordance with techniques of the present disclosure further described herein. Additionally, UI module 6 may cause UI device 4 to display a candidate word determined from the gesture in word suggestion areas 24.

Computing device 2, in some examples, includes language model 10. Language model 10 may include a lexicon. In some examples, a lexicon may include a listing of words and may include additional information about the listed words. A lexicon may be represented by a range of data structures, such as an array, a list, and/or a tree. For example, language model 10 may include a lexicon stored in a trie data structure. A lexicon trie data structure may contain a plurality of nodes, each node may represent a letter. The first node in a lexicon trie may be called the entry node which may not correspond to a letter. In other examples, the entry node may correspond to a letter. Each node may have one or more child nodes. For instance, the entry node may have twenty-six child nodes, each corresponding to a letter of the English alphabet.

A subset of the nodes in a lexicon trie may each include a flag which indicates that the node is a terminal node. Each terminal node of a lexicon trie may indicate a complete word (e.g., a candidate word). The letters indicated by the nodes along a path of nodes from the entry node to a terminal node may spell out a word indicated by the terminal node. In some examples, language model 10 may be a default dictionary installed on computing device 2. In other examples, language model 10 may include multiple sources of lexicons, which may be stored at computing device 2 or stored at one or more remote computing devices and are accessible to computing device 2 via one or more communication channels.

In some examples, language model 10 may be implemented in the firmware of computing device 2. Language model 10 may include language model frequency information such as n-gram language models. An n-gram language model may provide a probability distribution for an item $x_i$ (letter or word) in a contiguous sequence of items based on the previous items in the sequence (i.e., $P(x_i|x_{i-(n-1)}, \ldots, x_{i-1})$). For instance, a bigram language model (an n-gram model where n=2), may provide a probability that the letter "w" follows the sequence "no". In some examples, language model 10 includes a lexicon trie with integrated language model frequency information. For instance, each node of the lexicon trie may include a representation of a letter and a probability value.

Techniques of the present disclosure may improve the speed and accuracy with which a user can enter text into a computing device. Using techniques of this disclosure, a user may, instead of performing a discrete gesture for each keys of a word, perform a single gesture that indicates the word. As the user performs the gesture, the computing device may incrementally determine the word indicated by the gesture. By incrementally decoding the gesture as it is being performed, the user is presented with a candidate word with minimal post-gesture entry processing time. Moreover, by enabling the user to enter a word with a single gesture, techniques of this disclosure enable the user to increase the rate at which text is entered. Techniques of the disclosure are now further described herein with respect to components of FIG. 1.

As shown in the example of FIG. 1, UI module 6 may cause UI device 4 to display GUI 12. User 18 may desire to enter text, for example the word "now" into text entry area 14. User 18, in accordance with the techniques of this disclosure may perform a gesture at graphical keyboard 16. In one example, the gesture may be a continuous motion in which user 18's finger moves into proximity with UI device 4 such that the gesture performed by the finger is detected by UI device 4 throughout the performance of the gesture. In a different example, user 18 may, move his/her finger into proximity with UI device 4 such that the finger is temporarily detected by UI device 4 and then user 18's finger moves away from UI device 4 such that the finger is no longer detected. The gesture may include a plurality of portions. In some examples, the gesture may be divided into portions with substantially equivalent time durations. Where the gesture includes a plurality of portions, the gesture may include a final portion which may be portion of the gesture detected prior to detecting that the gesture is complete. For instance, a portion of the gesture may be designated as the final portion where user 18 moves his/her finger out of proximity with UI device 4 such that the finger is no longer detected.

While user 18 performs the gesture to select a group of keys of the plurality of keys, UI module 6 may detect a gesture having gesture path 22 at the presence-sensitive display. As shown in FIG. 1, user 18 performs the gesture by tracing gesture path 22 through or near keys of keyboard 16 that correspond to the characters of the desired word (i.e., the characters represented by "N" key 20A, "O" key 20B, and "W" key 20C). UI module 6 may send data that indicates gesture path 22 to gesture module 8. In some examples, UI module 6 incrementally sends data indicating gesture path 22 to gesture module 8 as gesture path 22 is detected by UI device 4 and received by UI module 6. For instance, UI module 6 may send a stream of coordinate pairs indicating gesture path 22 to gesture module 8 as gesture path 22 is detected by UI device 4 and received by UI module 6.

In response to receiving data that represents gesture path 22 from UI module 6, gesture module 8 may determine a candidate word. A candidate word may be a word suggested to the user that is composed of a group of keys indicated by gesture path 22. The group of keys may be determined based on gesture path 22 and a lexicon. Gesture module 8 may determine a candidate word by determining a group of alignment points traversed by gesture path 22, determining respective cost values for each of at least two keys of the plurality of keys, and comparing the respective cost values for at least each of at least two keys of the plurality of keys, as further described below.

An alignment point is a point along gesture path 22 that may indicate a key of the plurality of keys. An alignment point may include one or more coordinates corresponding to the determined position of the alignment point. For instance, an alignment point may include Cartesian coordinates corresponding to a point on GUI 12.

In some examples, gesture module 8 determines the group of alignment points traversed by gesture path 22 based on a plurality of features associated with gesture path 22. The plurality of features associated with gesture path 22 may include a length of a segment of gesture path 22. For instance, gesture module 8 may determine the length along the gesture segment from a previous alignment point and the current alignment point. For better alignments, the length will more closely approximate the straight-line distance between to two corresponding keyboard letters.

In another example, gesture module 8 may determine a direction of a segment from a first point to a second point of gesture path 22 to determine the group of alignment points. For better alignments, the direction of the segment will more closely approximate the direction of a straight line from between two corresponding keyboard letters.

In some examples, a curvature of a segment of gesture path 22, a local speed representing a rate at which a segment of path 22 was detected, and a global speed representing a rate at which gesture path 22 was detected. If gesture module 8 determines a slower speed or pause for the local speed, gesture module 8 may determine that a point at the segment is more likely to be an alignment point. If gesture module 8 determines that a gesture was drawn quickly, the gesture module 8 may determine the gesture is more likely to be imprecise and therefore gesture module 8 may increase the weigh on the language module (i.e., n-gram frequencies) than the spatial model. In one example, gesture module 8 may determine an alignment point of the group of alignment points based on a segment of gesture path 22 having a high curvature value. Additionally, gesture module 8 may determine an alignment point of the group of alignment points based on a segment of gesture path 22 having a low local speed (i.e., the user's finger slowed down while performing the segment of the gesture). In the example of FIG. 1, gesture module 8 may determine a first alignment point at the start of gesture path 22, a second alignment point at the point where gesture path 22 experiences a significant change in curvature, and a third alignment point at the end of gesture path 22. In still other examples, techniques of the disclosure can identify a shape of the gesture as a feature and determine an alignment point based on the shape of the gesture.

In some examples, gesture module 8 may determine respective cost values for each of at least two keys of the plurality of keys included in keyboard 16. Each of the respective cost values may represent a probability that an alignment point indicates a key. In some examples, the respective cost values may be based on physical features of the gesture path, the alignment point, and/or the key. For instance, the respective cost values may be based on the physical location of the alignment point with reference to the physical location of the key.

In some examples, the respective cost values may be based on language model 10. For instance, the respective cost values may be based on the probability that a second key will be selected after a first key (e.g., the probability that the "o" key will be selected after the "n" key). In some examples, the keys for which respective cost values are determined are selected based at least in part on language model 10. In some examples, the cost values are lower where there is a greater likelihood that an alignment point indicates a key. In other examples, the cost values are higher where there is a greater likelihood that an alignment point indicates a key.

In the example of FIG. 1, gesture module 8 may determine a first cost value representing a probability that the first alignment point indicates "N" key 20A and a second cost value representing a probability that the first alignment point indicates "B" key 20D. Similarly, gesture module 8 may determine a third cost value representing a probability that the second alignment point indicates "O" key 20B and a third cost value representing a probability that the second alignment point indicates "P" key 20E. Lastly, gesture module 8 may determine a fifth cost value representing a probability that the third alignment point indicates "W" key 20C and a sixth cost value representing a probability that the third alignment point indicates "Q" key 20F.

Gesture module 8 may compare the respective cost values for at least two keys of the plurality of keys to determine a combination of keys having a combined cost value. A combined cost value may represent a probability that gesture path 22 indicates a combination of keys. Gesture module 8 may compare the respective cost values for at least two keys of the plurality of keys to determine which of the at least two keys is indicated by an alignment point. Gesture module 8 may determine a combination of keys by determining which keys are indicated by each alignment point. In some examples, gesture module 8 determines which of the at least two keys is indicated by an alignment point without regard to which keys are indicated by other alignment points. In other examples, gesture module 8 determines which of the at least two keys is indicated by the alignment point based on which keys are indicated by other alignment points. In such examples, gesture module 8 may revise the determination of which key is indicated by a previous alignment point based on the respective cost values for a current alignment point.

In some examples, gesture module 8 may compare the combined cost value of a determined combination of keys with a threshold value. In some examples, the threshold value is the combined cost value of a different determined combination of keys. For instance, gesture module 8 may determine a first combination of keys having a first combined cost value and a second combination of keys having a second combined cost value. In such an instance, gesture module 8 may determine that the candidate word is based on the combination of keys with the lower combined cost value. In the example of FIG. 1, gesture module 8 may compare the determined respective cost values (i.e., first, second, third, fourth, fifth, and sixth) to determine a combination of keys (i.e., "N", "O", and "W") having a combined cost value.

In some examples, gesture module 8 begins to determine a candidate word prior to the time in which UI device 4 completes detecting gesture path 22. In the example of FIG. 1, rather than determining the candidate word after UI device 4 completes detecting gesture path 22, gesture module 8 may determine a plurality of words as gesture path 22 is detected, such as "no", "not", and "now". Additionally, in the example of FIG. 1, gesture module 8 may contemporaneously revise the determined plurality of words as gesture path 22 is detected, such as revision "no" to "bow". Furthermore, rather than determining the candidate word based on a geometric shape of the gesture, techniques of the disclosure may determine a candidate word based on a group of characters indicated by the gesture. Gesture module 8 may send the determined word to UI module 6 which may then cause UI device 4 to display the word "now" in text entry area 14 of GUI 12.

In some alternative embodiments, a user can pause when gesturing for a specified time duration at a key to indicate that the key should be included in the gesture path. In another alternative embodiment, rather than using a trie based search as described using techniques of the disclosure, gesture module 8 may maintain a separate gesture-specific word list or dictionary.

In some examples, techniques of the disclosure provide for efficient performance on computing devices, for instance, recognizing gestures in fewer than 100 milliseconds in some cases. Techniques of the disclosure may also use the default dictionary installed on the mobile device rather than using a dedicated gesture dictionary that may be maintained separately and use additional storage resources. In this way, techniques of the disclosure may reduce storage requirements by using a dictionary that is already stored by a default input entry system. Moreover, the dictionary may be implemented efficiently as a compact lexicon trie. Using a default dictionary already provided on a computing device also provides ready support foreign languages, contact names, and user added words in accordance with techniques of the disclosure. By using, e.g., a lexicon trie and the default dictionary, techniques of the disclosure may integrate the language model frequencies (i.e., n-gram probabilities) into the gesture interpretation, thereby allowing the search techniques to concentrate on the most promising paths for candidate words based on both the shape of the gesture and the probability of the word being considered.

Figure 2:
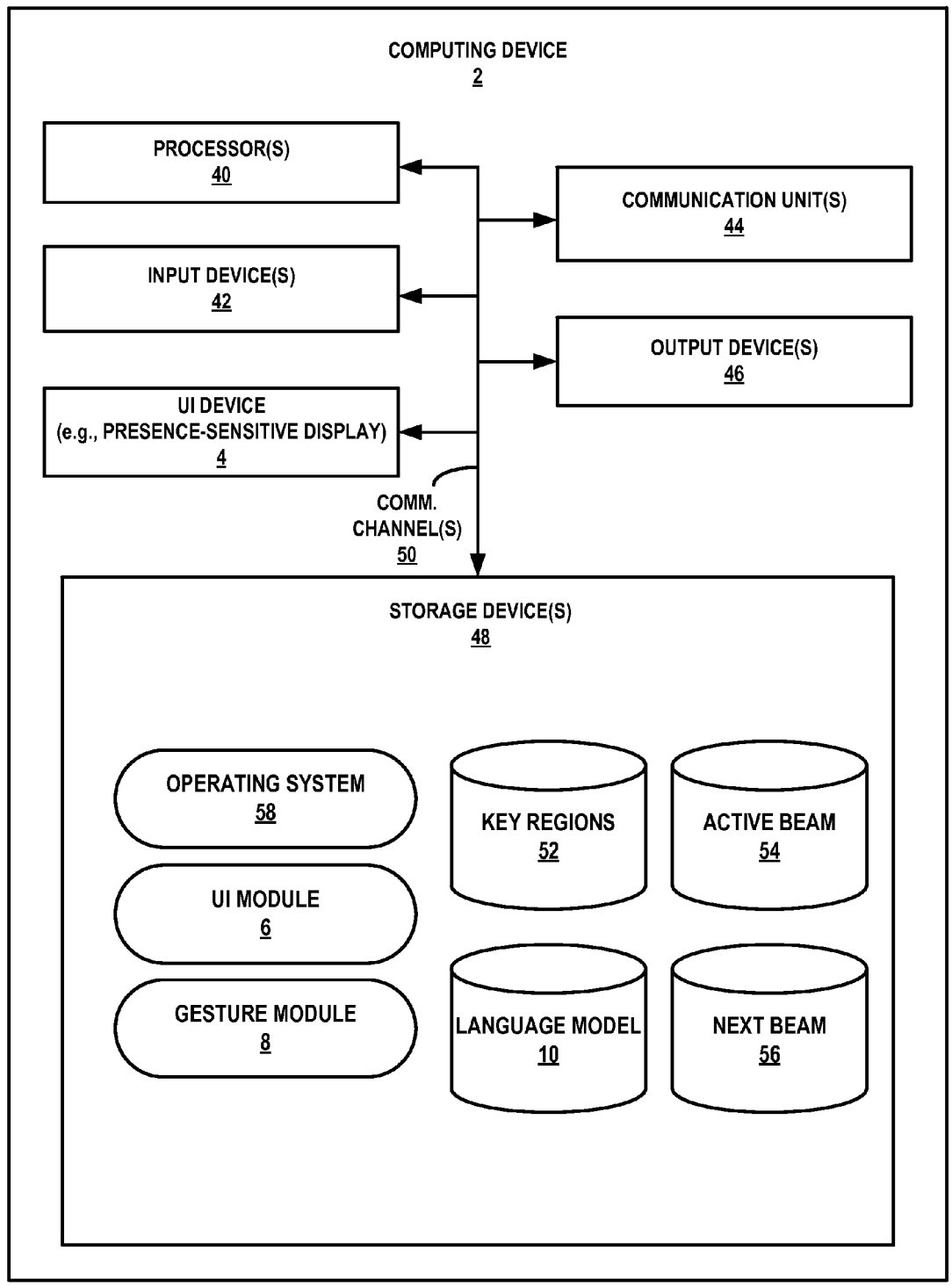
FIG. 2 is a block diagram illustrating further details of one example of a computing device as shown in FIG. 1, in accordance with one or more techniques of the present disclosure.

FIG. 2 is a block diagram illustrating further details of one example of a computing device shown in FIG. 1, in accordance with one or more techniques of the present disclosure. FIG. 2 illustrates only one particular example of computing device 2 as shown in FIG. 1, and many other examples of computing device 2 may be used in other instances.

As shown in the specific example of FIG. 2, computing device 2 includes one or more processors 40, one or more input devices 42, one or more communication units 44, one or more output devices 46, one or more storage devices 48, and user interface (UI) device 4. Computing device 2, in one example further includes UI module 6, gesture module 8, and operating system 58 that are executable by computing device 2. Computing device 2, in one example, further includes language model 10, key regions 52, active beam 54, and next beam 56. Each of components 4, 40, 42, 44, 46, and 48 (physically, communicatively, and/or operatively) for inter-component communications. In some examples, communication channels 50 may include a system bus, a network connection, an inter-process communication data structure, or any other method for communicating data. As one example in FIG. 2, components 4, 40, 42, 44, 46, and 48 may be coupled by one or more communication channels 50. UI module 6 and gesture module 8 may also communicate information with one another as well as with other components in computing device 2, such as language model 10, key regions 52, active beam 54, and next beam 56.

Processors 40, in one example, are configured to implement functionality and/or process instructions for execution within computing device 2. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., gesture module 8) to temporarily store information during program execution.

Storage devices 48, in some examples, also include one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 44 to wirelessly communicate with an external device such as a server.

Computing device 2, in one example, also includes one or more input devices 42. Input device 42, in some examples, is configured to receive input from a user through tactile, audio, or video feedback. Examples of input device 42 include a presence-sensitive display, a mouse, a keyboard, a voice responsive system, video camera, microphone or any other type of device for detecting a command from a user. In some examples, a presence-sensitive display includes a touch-sensitive screen.

One or more output devices 46 may also be included in computing device 2. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user. In some examples, UI device 4 may include functionality of input device 42 and/or output device 46. In the example of FIG. 2, UI device 4 may be a touch-sensitive screen.

In some examples, UI device 4 may include functionality of input device 42 and/or output device 46. In the example of FIG. 2, UI device 4 may be a presence-sensitive display. In some examples, a presence sensitive display may detect an object at and/or near the screen of the presence-sensitive display. As one example range, a presence-sensitive display may detect an object, such as a finger or stylus that is within 2 inches or less of the physical screen of the presence-sensitive display. The presence-sensitive display may determine a location (e.g., an (x,y) coordinate) of the presence-sensitive display at which the object was detected. In another example range, a presence-sensitive display may detect an object 6 inches or less from the physical screen of the presence-sensitive display and other exemplary ranges are also possible. The presence-sensitive display may determine the location of the display selected by a user's finger using capacitive, inductive, and/or optical recognition techniques. In some examples, presence sensitive display provides output to a user using tactile, audio, or video stimuli as described with respect to output device 46.

Computing device 2 may include operating system 58. Operating system 58, in some examples, controls the operation of components of computing device 2. For example, operating system 58, in one example, facilitates the communication of UI module 6 and/or gesture module 8 with processors 40, communication unit 44, storage device 48, input device 42, and output device 46. UI module 6 and gesture module 8 may each include program instructions and/or data that are executable by computing device 2. As one example, UI module 6 may include instructions that cause computing device 2 to perform one or more of the operations and actions described in the present disclosure.

Computing device 2 may include active beam 54. Active beam 54, in some examples, is configured to store one or more tokens created by gesture module 8. Active beam 54 may be included within storage devices 48. The specific functionality of active beam 54 is further described in the description of FIG. 3, below.

Computing device 2 may also include next beam 56. Next beam 56, in some examples, is configured to store one or more tokens created by gesture module 8. Next beam 56 may be included within storage devices 48. The specific functionality of next beam 56 is further described in the description of FIG. 3, below.

Computing device 2 can include additional components that, for clarity, are not shown in FIG. 2. For example, computing device 2 can include a battery to provide power to the components of computing device 2. Similarly, the components of computing device 2 shown in FIG. 2 may not be necessary in every example of computing device 2. For example, in some configurations, computing device 2 may not include communication unit 44.

In accordance with the techniques of this disclosure, computing device 2 may output a graphical keyboard comprising a plurality of keys at output device 44. User 18 may perform a gesture to select a group of keys of the plurality of keys at input device 42. In response to user 18 performing the gesture, input device 42 may detect a gesture path, such as gesture path 22 of FIG. 1, which may be received by UI module 6 as gesture path data. UI module 6 may then send the gesture path data to gesture module 8. In some examples, UI module 6 incrementally sends the gesture path data to gesture module 8 as gesture path 22 is detected by input device 42.

In response to receiving the gesture path data, gesture module 8 may create a token at the entry node of a lexicon which may be included in language model 10. In some examples, language module 10 may be implemented as a trie data structure. Each movable token may represent a partial alignment between a node in the lexicon (i.e., partial word) and a point along the gesture. As the token advances to child nodes in the lexicon (i.e., next letters in the word) the corresponding alignment point on the gesture may advance as well. As the token advances to the next letter in a word, techniques of the disclosure may determine how far the token needs to advance along the gesture-path. For instance, techniques of the disclosure may include search for an alignment point along the gesture that best aligns to a letter of a key, taking into account a number of features described below. The techniques are further described herein.

As described in FIG. 1, a lexicon trie data structure may contain a plurality of nodes, each node may represent a letter. Gesture module 8 may push the token into active beam 54. Gesture module 8 may create a token copy on each of the token's child nodes. In the example of FIG. 1, gesture module 8 may create a first token copy on the child node representing the letter "N" and a second token copy on the child node representing the letter "B".

For each token copy, gesture module 8 may determine, based on a plurality of features associated with the gesture path data, an alignment point traversed by the gesture. In the example of FIG. 1, gesture module 8 may determine that a first alignment point is located at the start of gesture path 22. In some examples, gesture module 8 may determine the curvature of the path at a point along the gesture path. In such examples, gesture module 8 may determine that the point is more likely to be an alignment point where there is a high curvature (where the gesture path changes direction abruptly at the point). In other examples, gesture module 8 may determine a mid-segment curvature (the maximum curvature of the gesture path between two points along the gesture). In another example, gesture module 8 may determine that a point is less likely to be the next alignment point where there is a high mid-segment curvature. In some examples, gesture module 8 may determine that a point is an alignment point based on the speed at which the gesture path was detected. In some examples, a slower rate of detection indicates that the point is an alignment point. In some examples, a high mid-segment curvature may indicate that there were corners between a first point and a second point, suggesting that the second point is less likely to be the next alignment point (i.e., a point was missed in-between).

In some examples, an alignment point may be based on the maximum distance between points of a gesture segment between two or more points and an ideal line from a first key to a second key. An ideal line may be, e.g., a shortest distance path from the first key to the second key. For a better alignment the maximum distance may be small, signifying that the gesture segment does not deviate from the ideal line.

For each alignment point, gesture module 8 may determine respective cost values for each of at least two keys of the plurality of keys. Each of the respective cost values may represent a probability that the alignment point indicates a key of the plurality of keys. In the example of FIG. 1, gesture module 8 may determine a first cost value representing a probability that the first alignment point indicates the node representing the letter "N" and a second cost value representing a probability that the first alignment point indicates the node representing the letter "B". In some examples, gesture module 8 may then update the token copy with the respective alignment point and/or cost value and push the token copy in next beam 56. In the example of FIG. 1, gesture module 8 may add the first cost value to the first token copy and the second cost value to the second token copy.

In some examples, gesture module 8 determines the respective cost values by comparing respective physical cost values with respective lexical cost values, as further described below. In some examples, gesture module 8 may weight the respective physical cost values differently than the respective lexical cost values. For instance, gesture module 8 may determine a cost value by summing the result of multiplying a physical cost value by a physical weighting value, and multiplying a lexical cost value by a lexical weighting value.

In some examples, gesture module 8 may determine that the lexical cost values should be weighted greater than the physical cost values. Gesture module 8 may determine that the lexical cost values should be weighted greater than the physical cost values where there is an indication that the physical cost values may be unreliable, such as where the gesture path is detected at high rate of speed. For instance, gesture module 8 may determine that a value associated with a feature (e.g., speed) satisfies one or more thresholds. For instance, gesture module 8 may determine that speed of the gesture is greater than or equal to a threshold value. In other examples, gesture module 8 may determine that the speed of the gesture is less than or equal to a threshold value. In any case, gesture module 8 may determine that the physical cost values are unreliable if the determined value satisfies a threshold.

In some examples, gesture module 8 may determine that the lexical cost values should be weighted greater than the physical cost values based on a determined raw distance of a gesture. In one example, a raw distance of a gesture may be a determined physical distance of a gesture that is performed by an input unit at a presence-sensitive display. For instance, when short gestures are spatially similar (e.g., "l×m" vs "in", "I'd" vs "is", etc.) gesture module 8 may weigh the physical cost higher than the lexical cost values. In other examples, gesture module 8 may weigh the lexical cost values higher than the physical cost values. As one example, gesture module 8 may initially determine the length of a gesture based a motion of an input unit (e.g., finger, stylus, etc.) at UI device 4. In response to determining the gesture length, gesture module 8 may apply a first weight to the lexical cost values and a second weight to the physical cost values to normalize the relative weights of the spatial and language models. The first weight may be greater than the second weight in some examples. For instance, when long gestures are spatially different and long, e.g., greater than a threshold distance, (e.g. a gesture that traverses the keyboard from the key "A" to key "P" to "L" to "E") gesture module 8 may apply a first weight to the lexical cost values that is greater than a second weight that is applied to the spatial cost values. In some examples, gesture module 8 may apply a first weight to the lexical cost values, but may not apply a second weight to the spatial cost values and vice versa. In this way, gesture module 8 may only apply a weight to one of the lexical or spatial cost values to increase and/or decrease the cost values to which the weight was applied. In other examples, the second weight may be greater than the first weight, for instance, when short gestures are short and spatially similar, e.g., less than a threshold distance. In some examples, the value of the weights may be proportional to the gesture length.

In some examples, gesture module 8 may use statistical machine learning to adapt to the style of the user and modify the weighting values over time. For instance, gesture module 8 may, in response to determining that the user is inaccurate while performing gestures, weigh the lexical cost values greater than the physical cost values. In some examples, gesture module 8 may determine that the physical cost values should be weighted greater than the lexical cost values. Gesture module 8 may determine that the physical cost values should be weighted greater than the lexical cost values where there is an indication that the lexical cost values may be unreliable, such as where the user has a history of entering words not included in the lexicon. In some examples, the weighting values may be estimated and optimized heuristically, such as by measuring accuracy from a plurality of computing devices.

Gesture module 8 may determine respective physical cost values for each of the at least two keys of the plurality of keys. Each of the respective physical cost values may represent a probability that physical features of an alignment point of the group of alignment points indicate physical features of a key of the plurality of keys. For instance, gesture module 8 may determine the respective physical cost values by evaluating the Euclidian distance between an alignment point of the group of alignment points and a keyboard position of key. Physical features of the plurality of keys may be included in key regions 52. For example, key regions 52 may include, for each of the plurality of keys, a set of coordinates that correspond to a location and/or area of graphical keyboard 16 where each key is displayed. In the example of FIG. 1, gesture module 8 may determine a first physical cost value based on the Euclidian distance between the first alignment point and "N" key 20A. In some examples, gesture module 8 may determine the physical cost values by comparing the Euclidian distance between a first alignment point and a second alignment point with the Euclidian distance between a first letter indicated by the first alignment point and a second letter which may be represented by the second alignment point. Gesture module 8 may determine that the cost value of the second letter is inversely proportional to the difference between the distances (i.e., that the second letter is more probable where the distances are more similar). For instance, a smaller distance may suggest a better alignment.

Gesture module 8 may also determine the respective cost values by determining respective lexical cost values for each of the at least two keys of the plurality of keys. Each of the respective lexical cost values may represent a probability that a letter represented by a key of the plurality of keys is included in the candidate word. The lexical cost values may be based on language model 10. For instance, the lexical cost values may represent the likelihood that a given letter is selected based on probable words included in language model 10. In the example of FIG. 1, gesture module 8 may determine a first lexical cost value based on an entry in language model 10 indicating a frequency that the letter "N" is the first letter in a word.

Gesture module 8 may determine whether the token is at a terminal node of the lexicon. In response to determining that the token is at a terminal node, gesture module 8 may add the token (or a representation thereof) to a list of output predictions. In some cases, gesture module 8 may compare the respective cost values for each node from the entry node to the terminal node to determine a combined cost value for the word indicated by the terminal node. In other cases, the combined cost value for the word indicated by the terminal node may be reflected by the token's cost value. In either case, gesture module 8 may then discard the token (i.e., remove the token from active beam 54). For instance, in one example, in the token passing process gesture module 8 may keep only a group of top-n tokens, and discard the rest. The top-n tokens may be the tokens with the most likely words or character strings. In this way, gesture module 9 may efficiently scale to large lexicons. Alternative embodiments may use any suitable search techniques.

Gesture module 8 may then determine whether UI module 6 has completed receiving the gesture path data. Where UI module 6 has completed receiving the gesture path data, gesture module 8 may output one or more candidate words for display at the presence-sensitive display. Where UI module 6 has not completed receiving the gesture path data, gesture module 8 may continue to incrementally process the gesture path data. In some examples, gesture module 8 may output one or more output predictions prior to UI module 6 completing reception of the gesture path data. The techniques are further described below in the description of FIG. 3.

Figure 3A:
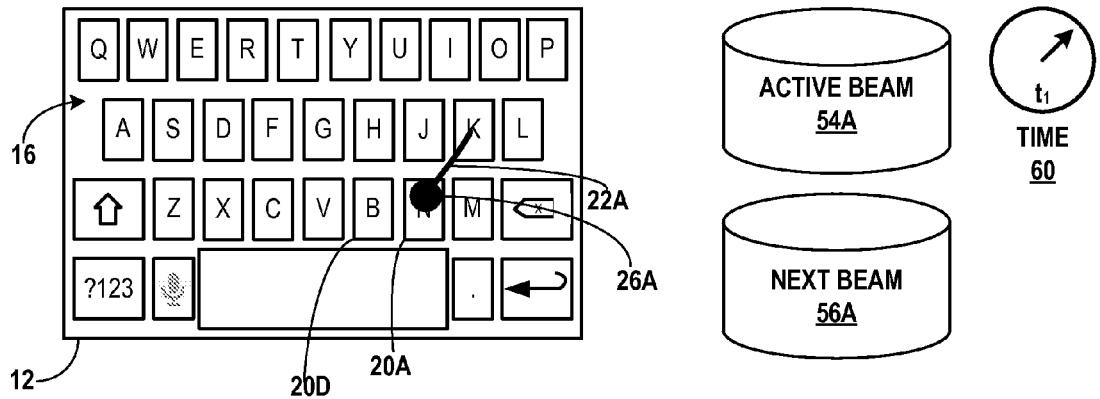
FIGS. 3A-C are block diagrams illustrating further details of one example of a computing device shown in FIG. 1, in accordance with one or more techniques of the present disclosure.
Figure 3B:
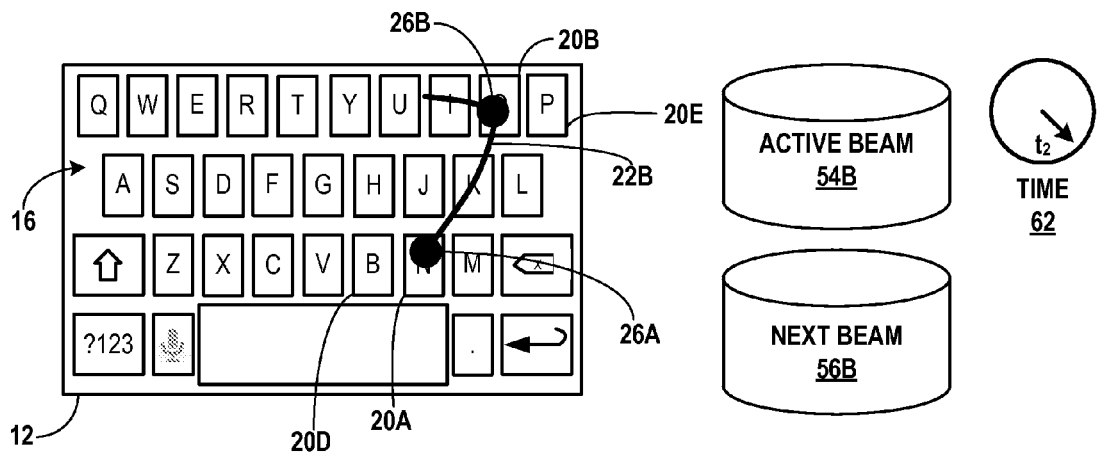
Figure 3C:
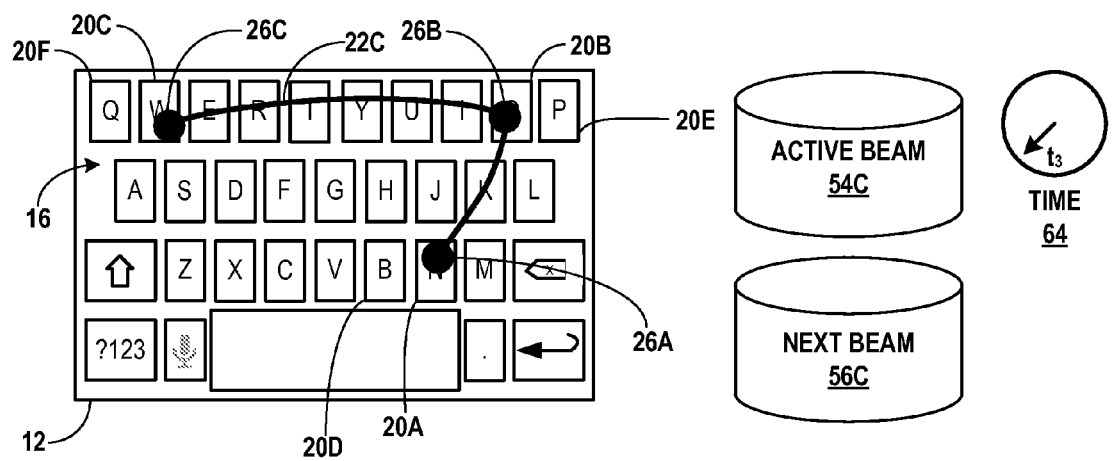

FIGS. 3A-C are block diagrams illustrating further details of one example of a computing device shown in FIG. 1, in accordance with one or more techniques of the present disclosure. As shown in the conceptual example of FIG. 3A, at time 60, computing device 2 may include GUI 12, active beam 54A, and next beam 56A. GUI 12 may include graphical keyboard 16 which may include "N" key 20A, "B" key 20D, gesture path 22A, and alignment point 26A. While shown in FIG. 3A, gesture path 22A and/or alignment point 26A may not be visible during the performance of the techniques described herein.

As shown in the example of FIG. 1, a user may desire to enter text into computing device 2 by performing a gesture at graphical keyboard 16. As previously discussed, while the user performs the gesture, computing device 2 may detect a gesture having a gesture path. In the example of FIG. 3A, computing device 2 is shown as having detected gesture path 22A.

In response to detecting gesture path 22A, computing device 2 may determine alignment point 26A along gesture path 22A. Additionally, in response to detecting gesture path 22A, computing device 2 may create a token and push the token into active beam 54A. At time 60, the contents on active beam 54A may be represented by Table 1 below.

TABLE 1

| Index | Parent Index | Letter Key of Current Node | Letter Chain | Cost Value |
|---|---|---|---|---|
| 0 | — | — | — | 0 |

In Table 1, each row represents an individual token, the index column represents a unique identifier for each token, the parent index column represents the index value of the token to which the listed token is a child, the letter key of the current node column represent the letter key represented by the current node of the token, the letter chain column represents all of the letter keys represented by the nodes from the entry node to the current node of the token, and the cost value column represent the cost value of the token. As shown in Table 1, the created token has an index of 0 (i.e., $token_0$), no parent index, no letter key of the current node, no letter chain, and a cost value of zero.

To determine the text indicated by the gesture, computing device 2 may create a copy of each token on its child nodes. In some examples, an entry node may have 26 child nodes (one for each letter of the English alphabet). For simplicity, in the example of FIG. 3A, the entry node has only two child nodes on the letters "B" and "N". Therefore, computing device 2 may create a copy of the token with index 0 on child node "N" (i.e. $token_1$) and child node "B" (i.e. $token_2$). For each created token copy, computing device 2 may determine a cost value as described above. Computing device 2 may push each token copy in to next beam 56A, the contents of which may be represented by Table 2 below.

TABLE 2

| Index | Parent Index | Letter Key of Current Node | Letter Chain | Cost Value |
|---|---|---|---|---|
| 1 | 0 | N | N | CV1 |
| 2 | 0 | B | B | CV2 |

The entries shown in Table 2 are identical in format to the entry shown in Table 1. In Table 2, $token^1$ has cost value CV1 and $token_2$ has cost value CV2. After creating the token copies, computing device 2 may determine that $token_0$ is not a terminal node and discard $token_0$. Computing device 2 may subsequently determine whether active beam 54A is empty (i.e., contains no tokens). In response to determining that active beam 54A is empty, computing device 2 may copy the contents of next beam 56A to active beam 54B of FIG. 3B and discard the contents of next beam 56A.

In the example of FIG. 3B, computing device 2 is shown as having detected gesture path 22B at time 62. As described above, the contents of active beam 54B may be represented by Table 2. Computing device 2 may determine alignment point 26B along gesture path 22B. Computing device 2 may, for each token in active beam 54B, create a copy on each child node. In the example of FIG. 3B, $token_1$ and $token_2$ each have child nodes with letter keys "O" and "P". For each created token copy, computing device 2 may determine a cost value as described above. Computing device 2 may push each token copy in to next beam 56B, the contents of which may be represented by Table 3 below.

TABLE 3

| Index | Parent Index | Letter Key of Current Node | Letter Chain | Cost Value |
|---|---|---|---|---|
| 3 | 1 | O | NO | CV1 + CV3 |
| 4 | 1 | P | NP | CV1 + CV4 |
| 5 | 2 | O | BO | CV2 + CV5 |
| 6 | 2 | P | BP | CV2 + CV6 |

The entries shown in Table 3 are identical in format to the entries shown in Table 1 and Table 2. In Table 3, the cost value for each token includes the cost value for the previous letters and the cost value for the current letter. Computing device 2 may determine which, if any, of the tokens are on terminal nodes. For instance, computing device 2 may determine that $token_3$ is on a terminal node because its letter chain "NO" is a word. In response to determining that a token is on a terminal node, computing device 2 may copy the token to a list of output predictions. The list of output predictions may be represented by Table 4 below. In some examples, computing device 2 may copy only the letter chain of the token to the list of output predictions.

TABLE 4

| Index | Parent Index | Letter Key of Current Node | Letter Chain | Cost Value |
|---|---|---|---|---|
| 3 | 1 | O | NO | CV1 + CV3 |

Computing device 2 may subsequently determine whether active beam 54A is empty. In response to determining that active beam 54B is empty, computing device 2 may copy the contents of next beam 56B to active beam 54C of FIG. 3C and discard the contents of next beam 56B.

In the example of FIG. 3C, computing device 2 is shown as having detected gesture path 22C at time 64. As described above, the contents of active beam 54C may be represented by table 3. Computing device 2 may determine alignment point 26C along gesture path 22C. Computing device 2 may, for each token in active beam 54C, create a copy on each child node. In the example of FIG. 3C, $token_3$ through token each have child nodes with letter keys "O" and "P". For each created token copy, computing device 2 may determine a cost value as described above. Computing device 2 may push each token copy in to next beam 56C, the contents of which may be represented by Table 5 below.

TABLE 5

| Index | Parent Index | Letter Key of Current Node | Letter Chain | Cost Value |
|---|---|---|---|---|
| 7 | 3 | W | NOW | CV1 + CV3 + CV7 |
| 8 | 3 | Q | NOQ | CV1 + CV3 + CV8 |
| 9 | 4 | W | NPW | CV1 + CV4 + CV9 |
| 10 | 4 | Q | NPQ | CV1 + CV4 + CV10 |
| 11 | 5 | W | BOW | CV2 + CV5 + CV11 |
| 12 | 5 | Q | BOQ | CV2 + CV5 + CV12 |
| 13 | 6 | W | BPW | CV2 + CV6 + CV13 |
| 14 | 6 | Q | BPQ | CV2 + CV6 + CV14 |

The entries shown in Table 5 are identical in format to the entries shown in Tables 1-3. In Table 5, the cost value for each token includes the cost value for the previous letters and the cost value for the current letter. Computing device 2 may determine which, if any, of the tokens are on terminal nodes. For instance, computing device 2 may determine that token$_7$ and token$_{11}$ are on terminal nodes because their respective letter chains "NOW" and "BOW" are words. In response to determining that a token is on a terminal node, computing device 2 may copy token$_7$ and token$_{11}$ to a list of output predictions. The list of output predictions may be represented by Table 6 below.

TABLE 6

| Index | Parent Index | Letter Key of Current Node | Letter Chain | Cost Value |
|---|---|---|---|---|
| 3 | 1 | O | NO | CV1 + CV3 |
| 7 | 3 | W | NOW | CV1 + CV3 + CV7 |
| 11 | 5 | W | BOW | CV2 + CV5 + CV11 |

Computing device 2 may subsequently determine whether active beam 54C is empty. In response to determining that active beam 54B is empty, computing device 2 may determine whether the user has completed performing the gesture. In response to determining that the user has completed performing the gesture, computing device 2 may output the list of output predictions. In some examples, computing device 2 may determine a subset of the list of output predictions which have the highest cost values (i.e., the predictions with the best probability). Additionally, in some examples, computing device 2 may, at each subsequent alignment point, revise the cost values of the tokens contained in the list of output predictions. For instance, computing device 2 may increase the cost value of token$_3$ (e.g., make token$_3$ less probable) in response to detecting gesture path 22C.

Figure 4A:
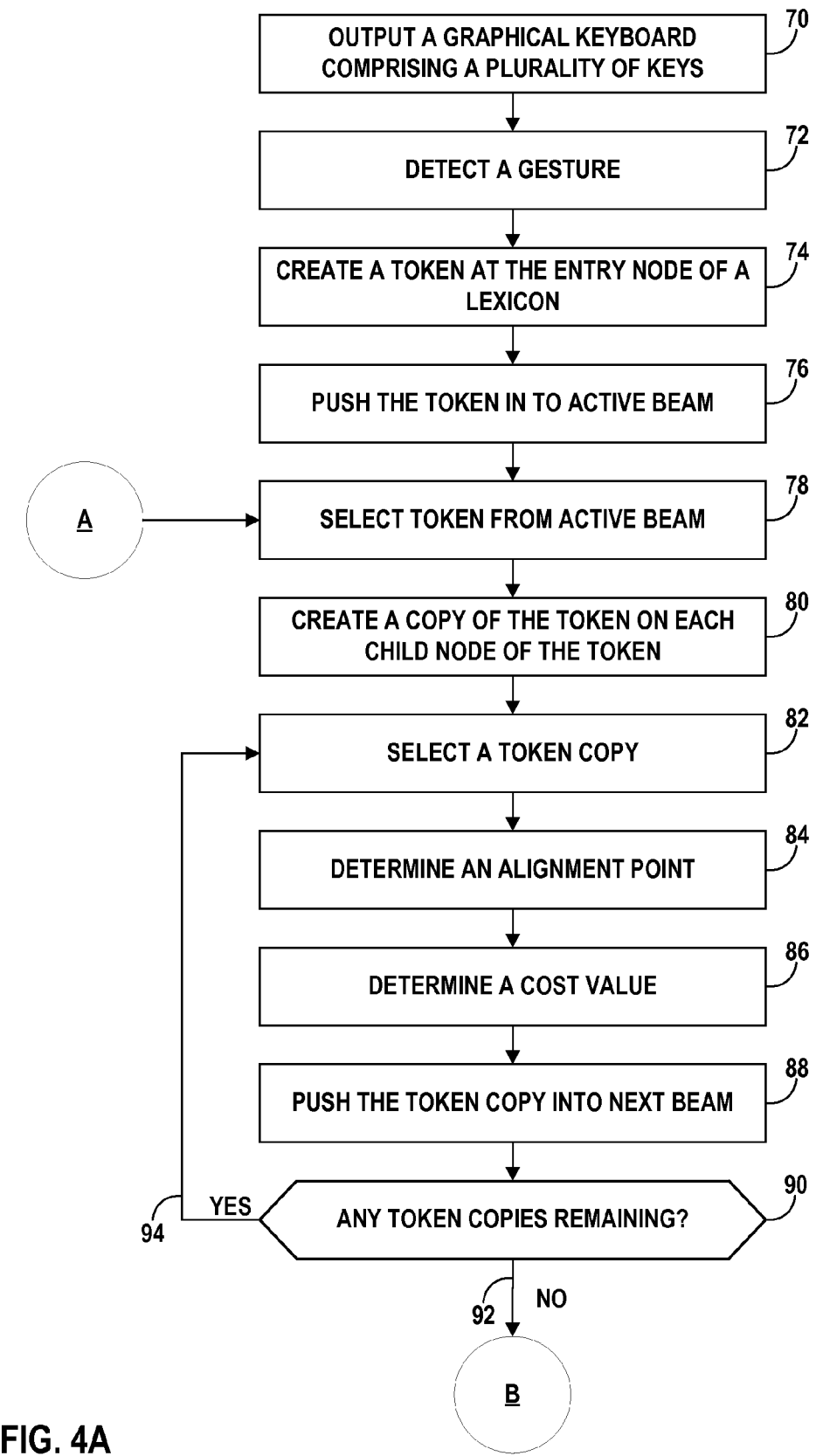
FIGS. 4A-B are flow diagrams illustrating example operations of a computing device to determine a candidate word from a gesture, in accordance with one or more techniques of the present disclosure.
Figure 4B:
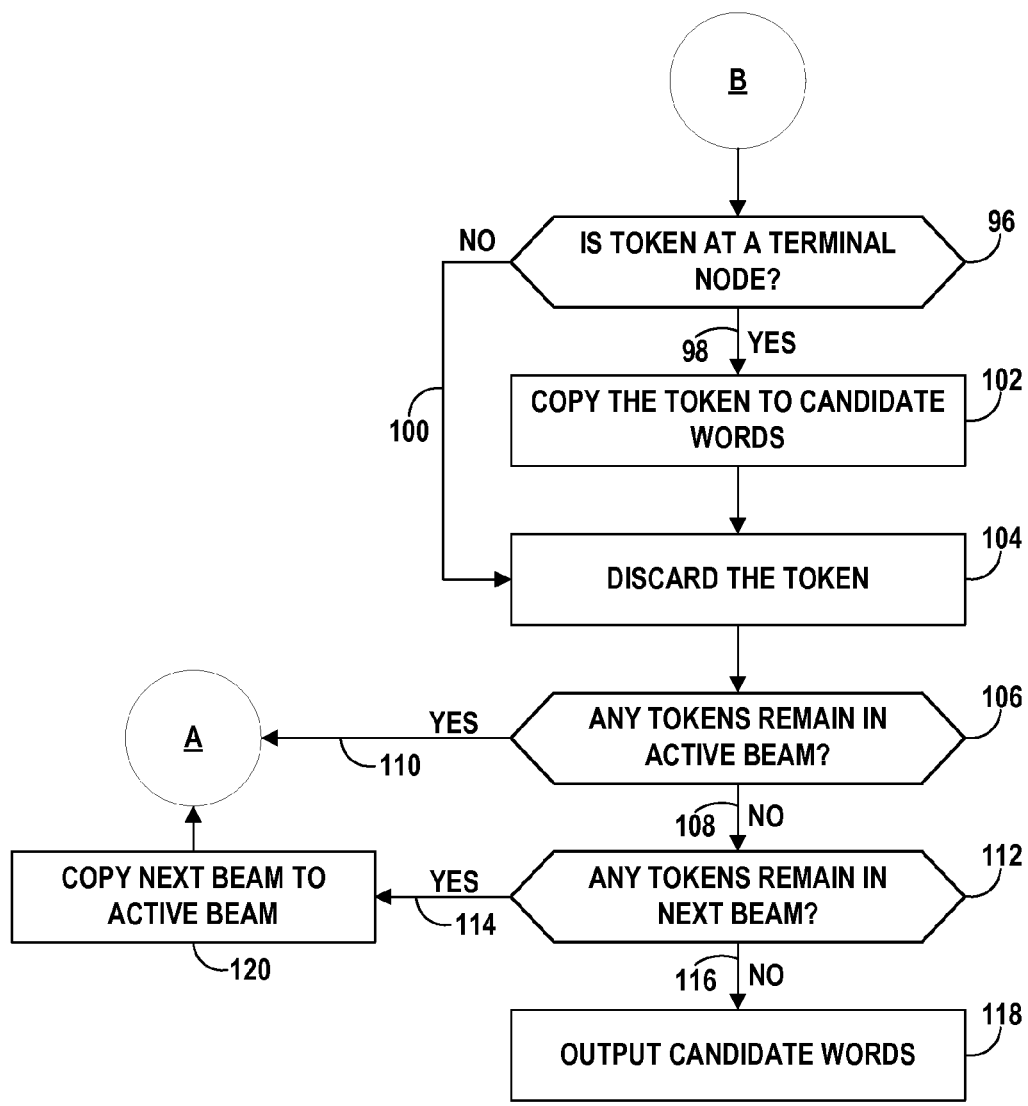

FIGS. 4A-B are flow diagrams illustrating example operations of a computing device to determine a candidate word from a gesture, in accordance with one or more techniques of the present disclosure. For purposes of illustration only, the example operations are described below within the context of computing device 2, as shown in FIGS. 1 and 2.

In the example of FIGS. 4A-B, computing device 2 may initially output a graphical keyboard comprising a plurality of keys at a presence-sensitive display (e.g., UI device 4) of computing device 2 (70). Computing device 2 may subsequently detect a gesture at the presence-sensitive display (72). In response to detecting the gesture, computing device 2 may create a token having a cost value of zero at the entry node of a lexicon stored on computing device 2 as a lexicon trie (74). Computing device 2 may push the token into an active beam (76). Computing device 2 may subsequently select a token from the active beam (78). Computing device 2 may create a copy of the token on each child node of the token (80). Computing device 2 may select a token copy (82) and determine an alignment point along the gesture (84). Computing device 2 may determine a cost value representing a probability that the alignment point indicates the letter key of the node on which the token copy is positioned and add the cost value to the token copy (86). Computing device 2 may push the token copy into a next beam (88). Computing device 2 may determine whether there are any token copies remaining (90). If there are token copies remaining (94), computing device 2 may select a new token copy (82).

If there are not any token copies remaining (92), computing device 2 may determine whether the token is at a terminal node of the lexicon trie (96). If the token is at a terminal node (98), computing device 2 may copy the word represented by the token to a list of candidate words (102). After copying the word to the list of candidate words, or if the token is not at a terminal node (100), computing device 2 may discard the token (104).

Computing device 2 may subsequently determine whether any tokens remain in the active beam (106). If there are tokens remaining in the active beam (110), computing device 2 may select a new token from the active beam (78). If there are no tokens remaining in the active beam (108), computing device 2 may determine whether any tokens remain in the next beam (112). If there are tokens remaining in the next beam (114), computing device 2 may copy the next beam to the active beam (120) and select a new token from the active beam (78). If there are no tokens remaining in the next beam (116), computing device 2 may output the list of candidate words at the presence-sensitive display (118).

In one example, techniques of the disclosure may be implemented using the following example pseudocode:

Initialization:
    Create a token t with cost=0 and index=0 in the entry node of the lexicon.
    push t into active_beam
Operations:
    while active_beam is not empty do
    Advance_tokens(active_beam, next_beam)
    active_beam=next_beam
    clear next_beam
    end
Advance_tokens(active_beam, next_beam):
    for each token t do
       let n be the node of token t
       let $k_1$ be the letter key of node n
       let $p_1$ be the current alignment point of token t
       for each child node c of n do
          let $k_2$ be the letter key of node c
          let $t_c$ be a copy of token t
          Align_key_to_gesture($t_c$, $k_1$, $k_2$, $p_1$)
          push $t_c$ into next_beam
       end
       if t is a terminal node then
          copy t to terminal list
       else
          discard t
       end
    end
Align_key_to_gesture(token t, key $k_1$, key $k_2$, point $p_1$):
    find the point $p_2$ along the gesture that best matches the input
    add the cost to token t
    update the current alignment point of token t to point $p_2$ In the above example pseudocode, active_beam may be active beam 54, next_beam may be next beam 56, and the lexicon may be included in language model 10.

Figure 5:
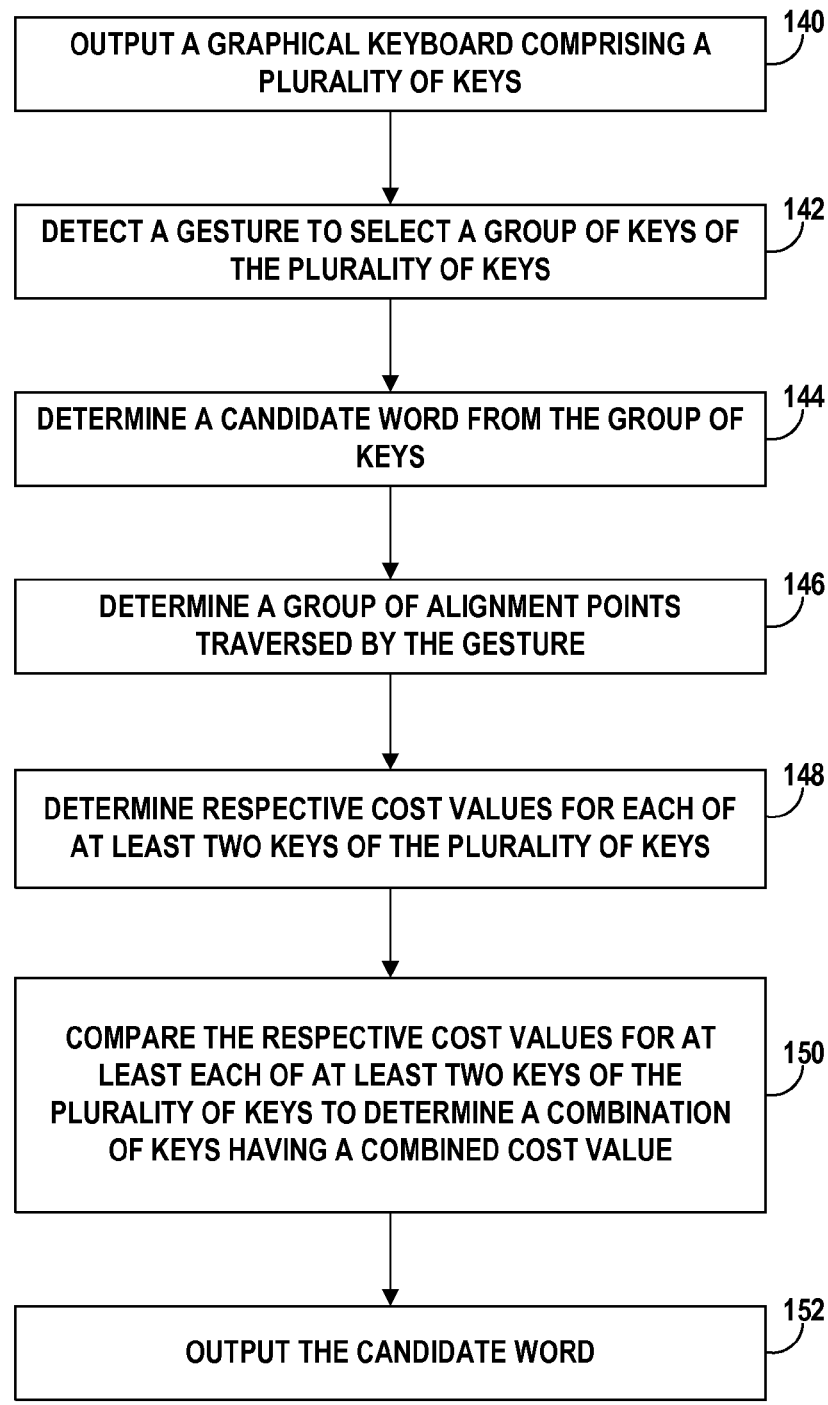
FIG. 5 is a flow diagram illustrating example operations of a computing device to determine a candidate word from a gesture, in accordance with one or more techniques of the present disclosure.

FIG. 5 is a flow diagram illustrating example operations of a computing device to determine a candidate word from a gesture, in accordance with one or more techniques of the present disclosure. For purposes of illustration only, the example operations are described below within the context of computing device 2, as shown in FIGS. 1 and 2.

In the example of FIG. 5, computing device 2 may initially output, for display at a presence-sensitive display operatively coupled to computing device 2, a graphical keyboard comprising a plurality of keys (140). Computing device 2 may subsequently detect a gesture at the presence-sensitive display to select a group of keys of the plurality of keys (142). In response to detecting the gesture, computing device 2 may determine a candidate word based at least in part on the group of keys (144).

In order to determine a candidate word based at least in part on the group of keys, computing device 2 may: determine, based on a plurality of features associated with the gesture, a group of alignment points traversed by the gesture (146); determine respective cost values for each of at least two keys of the plurality of keys (148); and compare the respective cost values for at least each of at least two keys of the plurality of keys to determine a combination of keys having a combined cost value (150). Computing device 2 may subsequently output the candidate word at the presence-sensitive display (152).

In one example, the operations include determining a first cost value for a first key of the plurality of keys based on a first alignment point of the group of alignment points and a second cost value for a second key of the plurality of keys based on a second alignment point of the group of alignment points.

In one example, the operations include determining respective physical cost values for each of the at least two keys of the plurality of keys, wherein each of the respective physical cost values represents a probability that physical features of an alignment point of the group of alignment points indicate physical features of a key of the plurality of keys; determining respective lexical cost values for each of the at least two keys of the plurality of keys, wherein each of the respective lexical cost values represents a probability that a key of the plurality of keys is included in the candidate word; and comparing the respective physical cost values with the respective lexical cost values to determine the respective cost values for each of the at least two keys of the plurality of keys. In one example, determining the respective physical cost values for each of the at least two keys may include comparing key regions of each of the at least two keys of the plurality of keys with at least one of the plurality of features associated with the gesture. In one example, the key regions comprise a location of the presence-sensitive display that outputs the respective key. In one example, determining the respective lexical cost values for each of the at least two keys may include comparing each of the at least two keys of the plurality of keys with a language model. In one example, the language model includes an n-gram language model. In one example, computing device 2 includes firmware and the language model is implemented in the firmware. In one example, comparing the respective physical cost values with the respective lexical cost values to determine the respective cost values for each of the at least two keys of the plurality of keys may include weighting the respective physical cost values differently than the respective lexical cost values. In one example, in response to determining that the physical cost values satisfy one or more thresholds, weighting the lexical cost values with a first weighting value, and weighting the physical cost values with a second weighting value, wherein the first weighting value is greater than the second weighting value.

In one example, the plurality of features associated with the gesture may include at least one of a length of a segment of the gesture, a direction of the segment of the gesture, a curvature of the segment of the gesture, a local speed representing a rate at which the segment of the gesture was detected, a global speed representing a rate at which the gesture was detected. In such an example, the segment of the gesture may include a path traversed by the gesture at the presence-sensitive display. In one example, the candidate word from the group of keys may be determined contemporaneously with the detection of the gesture to select the group of keys of the plurality of keys.

In one example, the operations include copying, in response to the detecting a portion of the gesture, a token from a first node of a lexicon to a second node of the lexicon, wherein the second node is a child node of the first node; determining, based on a plurality of features associated with the portion of the gesture, an alignment point traversed by the portion of the gesture; determining whether the second node is a terminal node, wherein each terminal node represents a candidate word; copying, in response to determining that the second node is a terminal node, the candidate word represented by the second node to a list of output predictions; determining whether the portion of the gesture is a final portion of the gesture; and outputting, in response to determining that the portion of the gesture is the final portion of the gesture, at least a portion of the list of output predictions for display at the presence-sensitive display. In one example, determining the alignment point traversed by the portion of the gesture may include determining a cost value for the alignment point, wherein the cost value represents a probability that the alignment point indicates the second node. In one example, determining the cost value for the alignment point includes determining a physical cost value for the alignment point; determining a lexical cost value for the alignment point; and comparing the physical cost value and the lexical cost value to determine the cost value for the alignment point. In one example, determining the lexical cost value for the alignment point may include comparing the alignment point with a language model. In one example, the lexicon may include the language model. In one example, the operations include determining a combined cost value for the candidate word; and removing, from the list output predictions, candidate words having combined cost values which fail to satisfy a threshold. In one example, the lexicon may be stored on the computing device as a trie data structure. In one example, each node of the lexicon corresponds to at least one key of the plurality of keys. In one example, outputting the candidate word that is based on the combination of keys may include outputting, for display at the presence-sensitive display, the candidate word in response to determining, by the computing device, that combined cost value of the combination of keys satisfies a threshold.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
    outputting, by a computing device and for display, a graphical keyboard comprising a plurality of keys;
    receiving an indication of a portion of a gesture entered at a presence-sensitive display to select at least one key of the plurality of keys, the gesture comprising a plurality of portions;
    maintaining, by the computing device and based at least in part on the gesture, a plurality of letter chains associated with respective combined cost values, wherein each letter chain corresponds to a different group of one or more keys of the graphical keyboard;
    incrementally determining for the portion of the gesture, by the computing device and in response to receiving the indication of the portion of the gesture, a candidate word, wherein the determining comprises:
        determining, by the computing device, a group of one or more alignment points traversed by the portion of the gesture;
        determining, by the computing device, respective cost values for each of at least two keys of the plurality of keys, wherein each of the respective cost values represents a probability that an alignment point of the group of alignment points indicates a key of the plurality of keys;
        updating, by the computing device and based at least in part on at least one of the respective cost values for one or more of the at least two keys, at least one of the respective combined cost values associated with at least one of the plurality of letter chains;
        comparing, by the computing device, the respective combined cost values respectively associated with the plurality of letter chains; and
    outputting, by the computing device for display and based at least in part on the comparison of the respective combined cost values, the candidate word.

2. The method of claim 1, wherein determining the respective cost values for each of the at least two keys of the plurality of keys comprises:
    determining, by the computing device, a first cost value for a first key of the plurality of keys based on a first alignment point of the group of alignment points and a second cost value for a second key of the plurality of keys based on a second alignment point of the group of alignment points.

3. The method of claim 1, wherein determining the respective cost values for each of the at least two keys of the plurality of keys comprises:
    determining respective physical cost values for each of the at least two keys of the plurality of keys, wherein each of the respective physical cost values represents a probability that at least one physical feature of an alignment point of the group of alignment points indicates at least one physical feature of a key of the plurality of keys;
    determining respective lexical cost values for each of the at least two keys of the plurality of keys, wherein each of the respective lexical cost values represents a probability that a letter represented by a key of the plurality of keys is included in the candidate word; and
    comparing the respective physical cost values with the respective lexical cost values to determine the respective cost values for each of the at least two keys of the plurality of keys.

4. The method of claim 3, wherein determining the respective physical cost values for each of the at least two keys comprises comparing key regions of each of the at least two keys of the plurality of keys with at least one of the plurality of features associated with the gesture, wherein the key regions comprise locations of the presence-sensitive display that output the respective keys.

5. The method of claim 3, wherein determining the respective lexical cost values for each of the at least two keys comprises comparing each of the at least two keys of the plurality of keys with a language model.

6. The method of claim 5, wherein the language model comprises an n-gram language model.

7. The method of claim 3, further comprising:
    weighting, by the computing device, the respective physical cost values differently than the respective lexical cost values.

8. The method of claim 7, further comprising:
    in response to determining that the physical cost values satisfy one or more thresholds, weighting the lexical cost values with a first weighting value, and weighting the physical cost values with a second weighting value, wherein the first weighting value is greater than the second weighting value.

9. The method of claim 1, further comprising:
    determining, by the computing device and based at least in part on a plurality of features associated with the gesture, the group of alignment points traversed by the gesture.

10. The method of claim 9, wherein the plurality of features associated with the gesture comprises at least one of:
    a length of a segment of the gesture, wherein the segment comprises a path traversed by the gesture at the presence-sensitive display;
    a direction of the segment of the gesture;
    a curvature of the segment of the gesture;
    a local speed that represents a rate at which the segment of the gesture was detected; and
    a global speed that represents a rate at which the gesture was detected.

11. The method of claim 1, wherein the candidate word is determined contemporaneously with the detection of the gesture to select the at least one key of the plurality of keys.

12. The method of claim 1, further comprising:
copying, in response to the detecting portion of the gesture, a token from a first node of a lexicon to a second node of the lexicon, wherein the second node is a child node of the first node;
determining, based on a plurality of features associated with the portion of the gesture, an alignment point traversed by the portion of the gesture;
determining whether the second node is a terminal node, wherein each terminal node represents the candidate word;
copying, in response to determining that the second node is a terminal node, the candidate word represented by the second node to a list of output predictions;
determining whether the portion of the gesture is a final portion of the gesture, wherein the final portion of the gesture comprises the portion of the gesture detected prior to detecting that the gesture is complete; and
outputting, for display and in response to determining that the portion of the gesture is the final portion of the gesture, at least a portion of the list of output predictions.

13. The method of claim 12, wherein determining the alignment point traversed by the portion of the gesture further comprises:
determining a cost value for the alignment point, wherein the cost value represents a probability that the alignment point indicates the second node.

14. The method of claim 13, wherein determining the cost value for the alignment point comprises:
determining a physical cost value for the alignment point;
determining a lexical cost value for the alignment point; and
comparing the physical cost value and the lexical cost value to determine the cost value for the alignment point.

15. The method of claim 14, wherein determining the lexical cost value for the alignment point comprises comparing the alignment point with a language model.

16. The method of claim 15, wherein the lexicon comprises the language model.

17. The method of claim 12, further comprising:
determining a combined cost value for the candidate word, wherein the combined cost value comprises a probability that the gesture indicates the candidate word; and
removing, from the list output predictions, candidate words having combined cost values which fail to satisfy a threshold.

18. The method of claim 12, wherein the lexicon is implemented, by the computing device, as a trie data structure.

19. The method of claim 12, wherein each node of the lexicon corresponds to at least one key of the plurality of keys.

20. The method of claim 1, wherein outputting the candidate word that is based on the combination of keys comprises outputting, for display, the candidate word in response to determining, by the computing device, that combined cost value of the combination of keys satisfies a threshold.

21. The method of claim 1, further comprising:
determining, by the computing device, a physical distance of the gesture performed at the presence-sensitive display;
determining, by the computing device, a weight based at least in part on the physical distance of the gesture; and
applying, by the computing device, the weight to at least one of a lexical cost value of a spatial model and a physical cost value of a language model.

22. A computing device, comprising:
at least one processor; and
at least one module operable by the at least one processor to:
output, for display a graphical keyboard comprising a plurality of keys;
receive an indication of a portion of a gesture to select at least one key of the plurality of keys, the gesture comprising a plurality of portions;
maintain, based at least in part on the gesture, a plurality of letter chains associated with respective combined cost values, wherein each letter chain corresponds to a different group of one or more keys of the graphical keyboard;
incrementally determine, for the portion of the gesture and in response to receiving the indication of the portion of the gesture, a candidate word;
determine a group of one or more alignment points traversed by the portion of the gesture;
determine respective cost values for each of at least two of the plurality of keys, wherein each of the respective cost values represents a probability that an alignment point of the group of alignment point indicates a key of the plurality of keys;
update, based at least in part on at least one of the respective cost values for one or more of the at least two keys, at least one of the respective combined cost values associated with at least one of the plurality of letter chains;
compare the respective combined cost values respectively associated with the plurality of letter chains; and
determine the candidate word based at least in part on the comparison of the respective combined cost values.

23. A non-transitory computer-readable storage medium encoded with instructions that, when executed, cause at least one processor of a computing device to:
output, for display, a graphical keyboard comprising a plurality of keys;
receive an indication of a portion of a gesture entered at a presence-sensitive display to select at least one key of the plurality of keys, the gesture comprising a plurality of portions;
maintain, based at least in part on the gesture, a plurality of letter chains associated with respective combined cost values, wherein each letter chain corresponds to a different group of one or more keys of the graphical keyboard;
incrementally determine, for the portion of the gesture and in response to receiving the indication of the portion of the gesture, a candidate word, wherein the determining comprises:
determine, by the computing device, a group of one or more alignment points traversed by the portion of the gesture;
determine, by the computing device, respective cost values for each of at least two keys of the plurality of keys, wherein each of the respective cost values represents a probability that an alignment point of the group of alignment points indicates a key of the plurality of keys;
update, based at least in part on at least one of the respective cost values for one or more of the at least two keys, at least one of the respective combined cost values associated with at least one of the plurality of letter chains;

compare, by the computing device, the respective combined cost values respectively associated with the plurality of letter chains; and output, for display and based at least in part on the comparison of the respective combined cost values, the candidate word.

* * * * *